United States Patent
Tani et al.

(10) Patent No.: US 12,449,711 B2
(45) Date of Patent: Oct. 21, 2025

(54) OPTICAL SCANNING ELEMENT

(71) Applicant: NGK INSULATORS, LTD., Nagoya (JP)

(72) Inventors: Kentaro Tani, Miyoshi (JP); Jungo Kondo, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 215 days.

(21) Appl. No.: 18/331,270

(22) Filed: Jun. 8, 2023

(65) Prior Publication Data

US 2023/0314899 A1 Oct. 5, 2023

Related U.S. Application Data

(63) Continuation of application No. PCT/JP2021/030283, filed on Aug. 19, 2021.

(30) Foreign Application Priority Data

Feb. 1, 2021 (JP) ................................. 2021-014636

(51) Int. Cl.
*G02F 1/295* (2006.01)

(52) U.S. Cl.
CPC ........ *G02F 1/2955* (2013.01); *G02F 2202/32* (2013.01)

(58) Field of Classification Search
CPC .... G02F 1/2955; G02F 2202/32; G02F 1/295; G02B 6/122; G02B 6/124
See application file for complete search history.

(56) References Cited

U.S. PATENT DOCUMENTS

| | | | |
|---|---|---|---|
| 7,242,839 B2 | 7/2007 | Sakai et al. |
| 8,002,998 B2 | 8/2011 | Iwata et al. |
| 9,753,351 B2 | 9/2017 | Eldada |
| 9,964,833 B2 | 5/2018 | Eldada |

(Continued)

FOREIGN PATENT DOCUMENTS

| | | |
|---|---|---|
| JP | H08-211425 A | 8/1996 |
| JP | 2005-274840 A | 10/2005 |

(Continued)

OTHER PUBLICATIONS

Japanese Office Action (with English translation) dated Apr. 16, 2024 (Application No. 2022-578027).

(Continued)

*Primary Examiner* — John Bedtelyon
(74) *Attorney, Agent, or Firm* — BURR PATENT LAW, PLLC

(57) ABSTRACT

There is provided an optical scanning element, which has a large scan angle, is quickly responsive, and can be downsized. An optical scanning element according to an embodiment of the present invention includes: a first light-deflecting unit for emitting light to a first area; and a second light-deflecting unit for emitting the light that has been emitted to the first area to a second area wider than the first area. The first light-deflecting unit is configured to be changed in refractive index by a change in applied voltage, and to adjust the first area through the change in refractive index, and the second light-deflecting unit is configured to adjust the second area through diffraction.

9 Claims, 12 Drawing Sheets

(56) References Cited

U.S. PATENT DOCUMENTS

| | | | |
|---|---|---|---|
| 10,665,953 | B1 | 5/2020 | Akselrod et al. |
| 11,079,541 | B2 * | 8/2021 | Baba ............... G01N 21/49 |
| 11,448,729 | B2 | 9/2022 | Baba et al. |
| 2008/0019648 | A1 | 1/2008 | Atwater et al. |
| 2015/0378241 | A1 | 12/2015 | Eldada |
| 2017/0184707 | A1 | 6/2017 | Sugiura et al. |
| 2018/0074384 | A1 | 3/2018 | Eldada |
| 2021/0273411 | A1 | 9/2021 | Uenoyama et al. |
| 2022/0171101 | A1 | 6/2022 | Baba et al. |

FOREIGN PATENT DOCUMENTS

| | | |
|---|---|---|
| JP | 2008-052108 A | 3/2008 |
| JP | 4208754 B2 | 1/2009 |
| JP | 2016-065964 A | 4/2016 |
| JP | 2017-521734 A | 8/2017 |
| JP | 2019-201065 A | 11/2019 |
| WO | 2017/126386 A1 | 7/2017 |
| WO | 2018/003852 A1 | 1/2018 |
| WO | 2018/186471 A1 | 10/2018 |
| WO | 2020/090487 A1 | 5/2020 |

OTHER PUBLICATIONS

English translation of the International Preliminary Report on Patentability (Chapter I) dated Aug. 10, 2023 (Application No. PCT/JP2021/030283).

Japanese Office Action (Application No. 2022-578027) dated Jun. 11, 2024 (with English translation) (10 pages).

International Search Report and Written Opinion (Application No. PCT/JP2021/030283) dated Nov. 2, 2021.

Miyamoto et al., "*Design of an Optical Phased Array with Narrow Pitch Waveguides Using Electro-Optic Polymers,*" Proceedings of the Annual Meeting of the Institute of Image Information and Television Engineers, 2018, p. 32C-4.

Japanese Office Action (with English translation) dated Jul. 8, 2025 (Application No. 2024-173239).

* cited by examiner

OPTICAL SCANNING ELEMENT

CROSS-REFERENCE TO RELATED APPLICATIONS

This application is a continuation under 35 U.S.C. 120 of International Application PCT/JP2021/030283 having the International Filing Date of 19 Aug. 2021 and having the benefit of the earlier filing date of Japanese Application No. 2021-014636, filed on 1 Feb. 2021. Each of the identified applications is fully incorporated herein by reference.

BACKGROUND OF THE INVENTION

1. Field of the Invention

The present invention relates to an optical scanning element.

2. Description of the Related Art

Along with the progress of multimedia and digital signage, there has been a growing demand for a high-definition, high-image quality, and large-screen display or projector, and hence the development of an optical scanning element for scanning an object with laser light at a wide angle has become active. In recent years, an investigation has been made on the application of the optical scanning element to an obstacle-detecting system or a ranging system for the automatic operation control of an automobile or for the position control of a robot or a drone because the element can be used as a laser radar, a laser scanner, or light detection and ranging (LiDAR). A light deflector obtained by arranging a radiation mechanism on a silicon photonic crystal waveguide has been proposed as an example of the optical scanning element (Patent Literatures 1 to 4). However, such light deflector has such a configuration that its deflection angle is changed for each wavelength or the deflection angle is changed by heating the element. Accordingly, when the light deflector is used in such applications as described above, its scan angle is not sufficient. In addition, the light deflector of such a type that its deflection angle is changed for each wavelength involves a problem in that a plurality of light sources having different wavelengths are required, and the light deflector of such a type as to be heated involves a problem in that its response is slow.

CITATION LIST

Patent Literature

[PTL 1] WO 2017/126386 A1
[PTL 2] WO 2018/003852 A1
[PTL 3] WO 2018/186471 A1
[PTL 4] JP 4208754 B2

SUMMARY OF THE INVENTION

A primary object of the present invention is to provide an optical scanning element, which has a large scan angle, is quickly responsive, and can be downsized.

An optical scanning element according to an embodiment of the present invention includes: first light-deflecting means for emitting light to a first area; and second light-deflecting means for emitting the light that has been emitted to the first area to a second area wider than the first area. The first light-deflecting means is configured to be changed in refractive index by a change in applied voltage, and to adjust the first area through the change in refractive index, and the second light-deflecting means is configured to adjust the second area through diffraction.

In one embodiment, the first light-deflecting means is one selected from the group consisting of: a combination of a photonic crystal and a diffraction grating; an optical phased array; and a variable optical metasurface.

In one embodiment, the second light-deflecting means is a diffraction grating.

In one embodiment, the first light-deflecting means includes: a photonic crystal layer obtained by periodically forming holes in an electro-optical crystal substrate; a line-defect optical waveguide formed in the photonic crystal layer; a diffraction grating arranged in at least one portion selected from an upper portion, a left side surface portion, and a right side surface portion of the optical waveguide; and electrodes arranged on a left side and a right side of the optical waveguide. The first light-deflecting means is configured so that an emission angle of light emitted from an upper surface of the optical waveguide changes.

In one embodiment, the diffraction grating has a plurality of grating grooves extending in a direction substantially perpendicular to a waveguide direction of the optical waveguide.

In one embodiment, the second light-deflecting means is a diffraction grating having grating grooves, and the direction in which the grating grooves extend in the first light-deflecting means and a direction in which the grating grooves extend in the second light-deflecting means are substantially perpendicular to each other.

In one embodiment, the second light-deflecting means is a diffraction grating having grating grooves, and the direction in which the grating grooves extend in the first light-deflecting means and a direction in which the grating grooves extend in the second light-deflecting means are substantially parallel to each other.

In one embodiment, the first light-deflecting means further includes: a support substrate arranged below the electro-optical crystal substrate, the support substrate being configured to support the electro-optical crystal substrate; a joining portion configured to integrate the electro-optical crystal substrate and the support substrate with each other; and a cavity defined by a lower surface of the electro-optical crystal substrate, an upper surface of the support substrate, and the joining portion.

In one embodiment, the electro-optical crystal substrate includes one selected from the group consisting of: lithium niobate; lithium tantalate; potassium titanate phosphate; potassium lithium niobate; potassium niobate; potassium tantalate niobate; and a solid solution of lithium niobate and lithium tantalate.

DESCRIPTION OF THE EMBODIMENTS

Embodiments of the present invention are described below. However, the present invention is not limited to these embodiments. The term "left side" or "right side" as used herein means a left side or a right side with respect to the waveguide direction of an optical waveguide (direction in which light travels in the optical waveguide). The phrase "substantially parallel" encompasses a case in which an angle formed by two directions is 0°±5°, and the angle is preferably 0°±3°, more preferably 0°±1°. The phrase "substantially perpendicular" encompasses a case in which an angle formed by two directions is 90°±5°, and the angle is preferably 90°±3°, more preferably 90°±1°. In addition, the simple term "parallel" or "perpendicular" encompasses the concept of the phrase "substantially parallel" or "substantially perpendicular."

A. Concept and Schematic Configuration of Optical Scanning Element

Figure 1A:
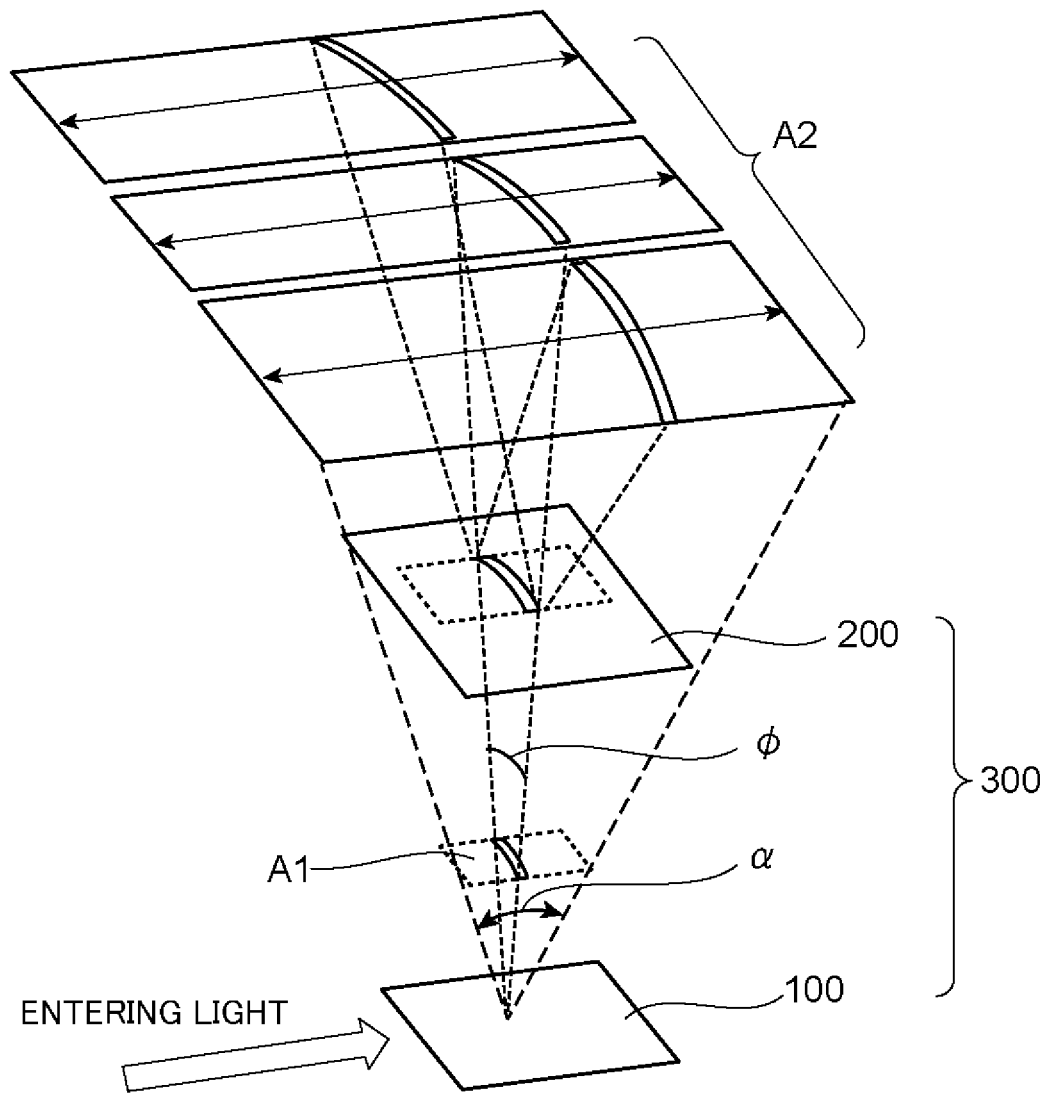
FIG. 1A is a conceptual view for illustrating the mechanism via which an optical scanning range is spread by one embodiment of the present invention.
Figure 1B:
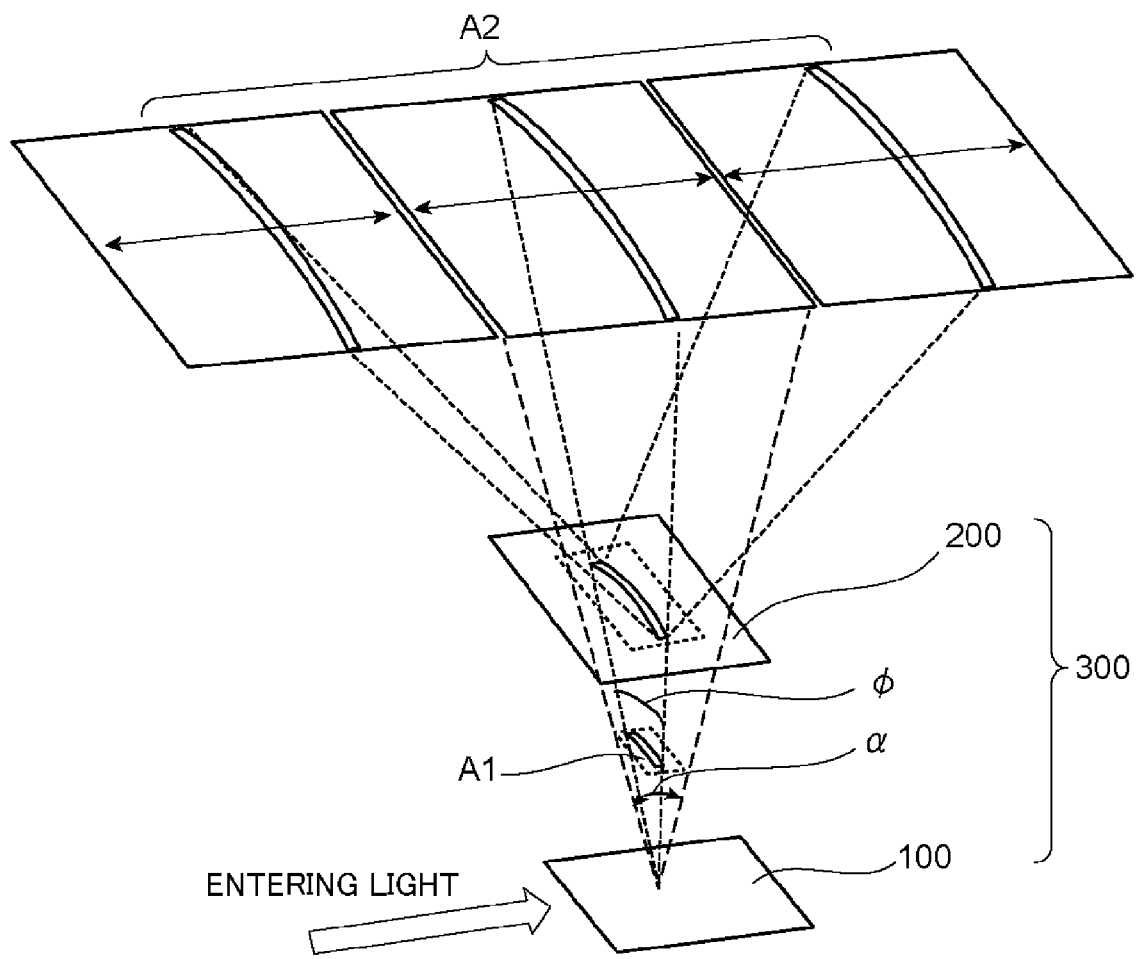
FIG. 1B is a conceptual view for illustrating the mechanism via which the optical scanning range is spread by another embodiment of the present invention.

First, the mechanism via which an optical scanning range is spread by the embodiment of the present invention is conceptually described. FIG. 1A and FIG. 1B are each a conceptual view for illustrating such mechanism. An optical scanning element 300 includes first light-deflecting means 100 and second light-deflecting means 200. The first light-deflecting means 100 emits light (light that has entered the optical scanning element) to a first area A1. The first light-deflecting means 100 is typically configured to be changed in refractive index by a change in applied voltage, and to adjust the first area through the change in refractive index. More specifically, the means is as described below. The light emitted from the first light-deflecting means 100 is typically so-called fan beams that are line shapes in plan view (line shapes in a direction perpendicular to the optical waveguide direction) and are a fan shape when viewed from the optical waveguide direction. When the refractive index in the first light-deflecting means 100 is changed by the application of a voltage, the variable range α of the emission angle of the light can be adjusted. As a result, the length of the first area A1 in the optical waveguide direction can be adjusted. That is, in the illustrated example, the first light-deflecting means 100 can emit the light (fan beams) to any appropriate position of the first area A1 in the optical waveguide direction. The angle (spread angle of the fan beams) ϕ of the fan can be controlled by adjusting the width of the optical waveguide. Thus, the first area A1 (substantially, the shape of the first area: the lengths thereof in the optical waveguide direction and the direction perpendicular to the optical waveguide direction) can be adjusted by the first light-deflecting means 100. Further, the following advantage may be obtained by adopting, as the first light-deflecting means, a configuration that is changed in refractive index by a change in applied voltage, and adjusts the area to which the light is emitted through the change in refractive index. That is, such first light-deflecting means can continuously change the emission angle through a continuous change in voltage. Accordingly, the optical scanning element using such first light-deflecting means can irradiate a target object with the light without causing any irradiation defect. As a result, an extremely excellent resolution can be achieved, and hence safety and reliability when the optical scanning element is used as LiDAR can be markedly improved. In the illustrated example, for ease of viewing, the first area A1 is defined at a position distant from the first light-deflecting means 100 by a predetermined distance. However, a difference in area of the first area A1 due to a difference in distance thereof from the first light-deflecting means 100 does not become a problem because the first light-deflecting means 100 and the second light-deflecting means 200 are close to each other. Substantially, the first area A1 only needs to be defined at the position of the second light-deflecting means 200.

Any appropriate configuration may be adopted as the first light-deflecting means 100 as long as the configuration is changed in refractive index by a change in applied voltage, and can adjust the first area through the change in refractive index. Examples of such configuration include: a combination of a photonic crystal and a diffraction grating; an optical phased array; and a variable optical metasurface. The combination of the photonic crystal and the diffraction grating is described as a typical example later in the section B. The optical phased array controls the phase of input light distributed to its waveguide array through an electro-optical effect to control the deflection direction thereof. The array may be one-dimensional (linear), or may be two-dimensional (matrix shape). The array is preferably one-dimensional. This is because the array has a high affinity for the second light-deflecting means (typically, a diffraction grating). A configuration described in, for example, JP 2017-521734 A may be adopted as the optical phased array. The term "metasurface" refers to a technology in which the transmittance, phase, deflection direction, wavefront, and the like of light are controlled with a structural body having a size less than its wavelength. In a variable metasurface, for example, a mechanical, optical, or electro-optical deformation mechanism is added to the metasurface to enable the control of its optical characteristics. The variable optical metasurface is, for example, a configuration that applies different voltages to respective optical resonant antennas arrayed in a one-dimensional array manner to control the deflection direction of light. As in the case of the above-mentioned optical phased array, such one-dimensional array configuration has a high affinity for the second light-deflecting means (typically, a diffraction grating). A configuration described in, for example, U.S. Ser. No. 10/665,953 B1 may be adopted as the variable optical metasurface. Only such a configuration that its refractive index is directly changed by an electric field may be adopted as the first light-deflecting means 100, and for example, a configuration whose refractive index is changed by utilizing a thermooptic effect exhibited by the Joule heat of an electric current generated by the application of a voltage is not included.

The second light-deflecting means 200 emits the light that has been emitted to the first area A1 to a second area A2 wider than the first area A1. The second light-deflecting means 200 is typically configured to adjust the second area A2 through diffraction. That is, the second light-deflecting means 200 may be a diffraction grating. The use of the diffracted light of the light emitted to the first area A1, the diffracted light having a predetermined diffraction order, enables the emission of the light to the second area A2 wider than the first area A1. The diffraction grating typically has grating grooves. The adjustment of the direction in which the grating grooves extend can adjust the second area A2 (substantially, the spread of the second area). For example, when the direction in which the grating grooves of the diffraction grating extend is set to a direction substantially parallel to the optical waveguide direction, plus and minus first-order diffraction images can be formed in a direction substantially perpendicular to the optical waveguide direction by a diffraction effect on the first area A1, and as a result, can be spread as the second area A2. Such configuration may be useful when the first area A1 has an elongated shape along the optical waveguide direction as illustrated in FIG. 1A. In particular, the first light-deflecting means, which is changed in refractive index by a change in applied voltage, and adjusts the area to which the light is emitted through the change in refractive index, can adjust the emission range of the light substantially only in the optical waveguide direction, and hence the effect of combining the means with the second light-deflecting means becomes significant. In addition, for example, when the direction in which the grating grooves of the diffraction grating extend is set to a direction substantially perpendicular to the optical waveguide direction, plus and minus first-order diffraction images can be formed in the optical waveguide direction by the diffraction effect on the first area A1, and as a result, can be spread as the second area A2. Such configuration may be useful when the first area A1 has an elongated shape along a direction substantially perpendicular to the optical waveguide direction as illustrated in FIG. 1B. It may be difficult to enlarge the spread angle $\phi$ of the fan beams, and to enlarge the variable range $\alpha$ of the emission angle only with the first light-deflecting means. In contrast, when the first light-deflecting means and the second light-deflecting means are combined with each other, in the case where the spread angle $\phi$ of the fan beams emitted from the first light-deflecting means is large, the variable range $\alpha$ of the emission angle can be substantially spread in the optical waveguide direction. In the illustrated example, a case in which zeroth-order light, and plus and minus first-order light beams are used is depicted. However, as described above, diffracted light having any appropriate diffraction order may be used as the diffracted light in accordance with purposes.

The term "optical scanning element" as used herein encompasses both of a wafer (optical scanning element wafer) having formed thereon at least one optical scanning element and a chip obtained by cutting the optical scanning element wafer.

A configuration in which the first light-deflecting means is a combination of a photonic crystal and a diffraction grating is described below as a typical example of the optical scanning element.

B. First Light-Deflecting Means

B-1. Overall Configuration of First Light-Deflecting Means

Figure 2A:
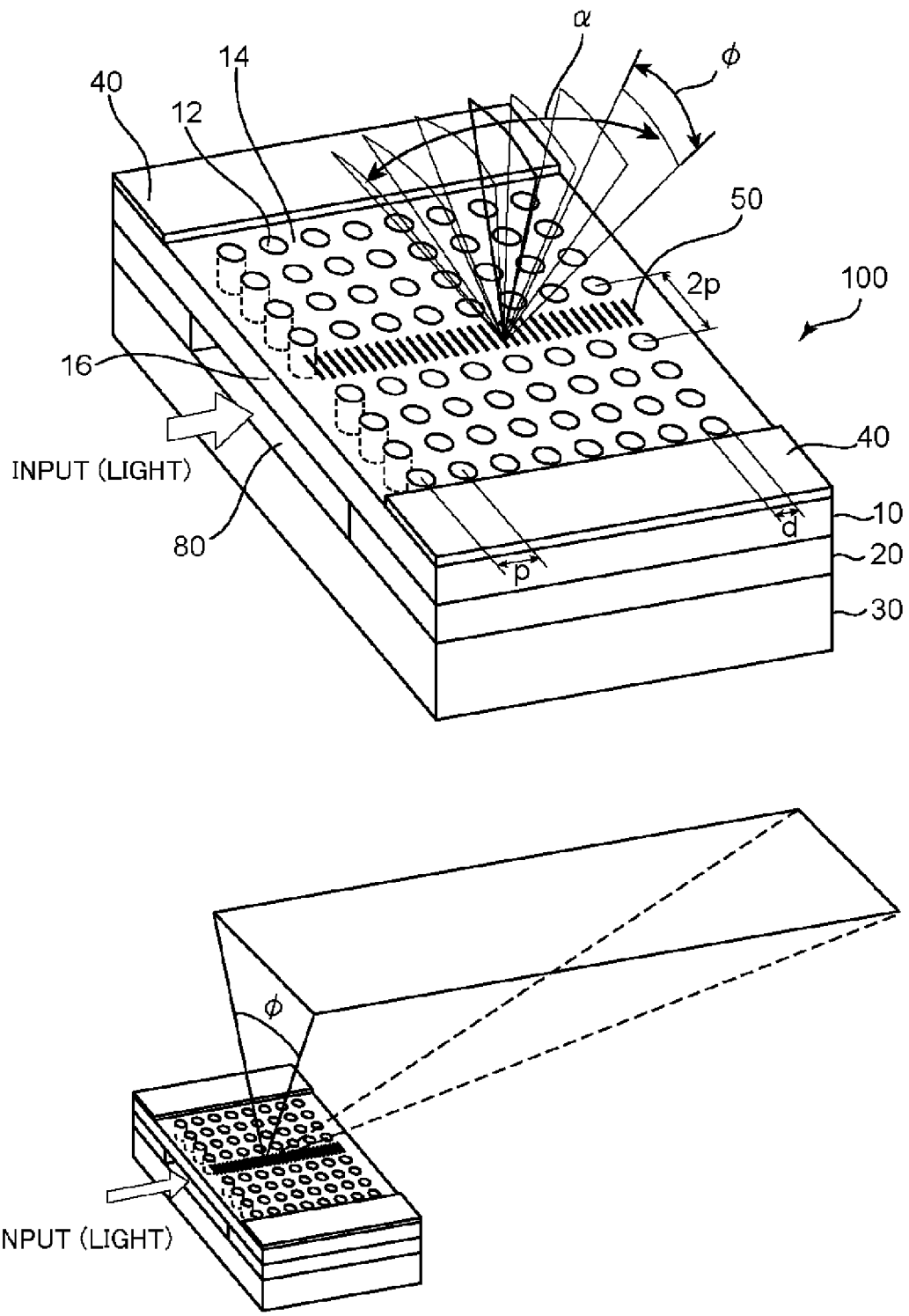
FIG. 2A is a schematic perspective view for illustrating first light-deflecting means in an optical scanning element according to one embodiment of the present invention.
Figure 2B:
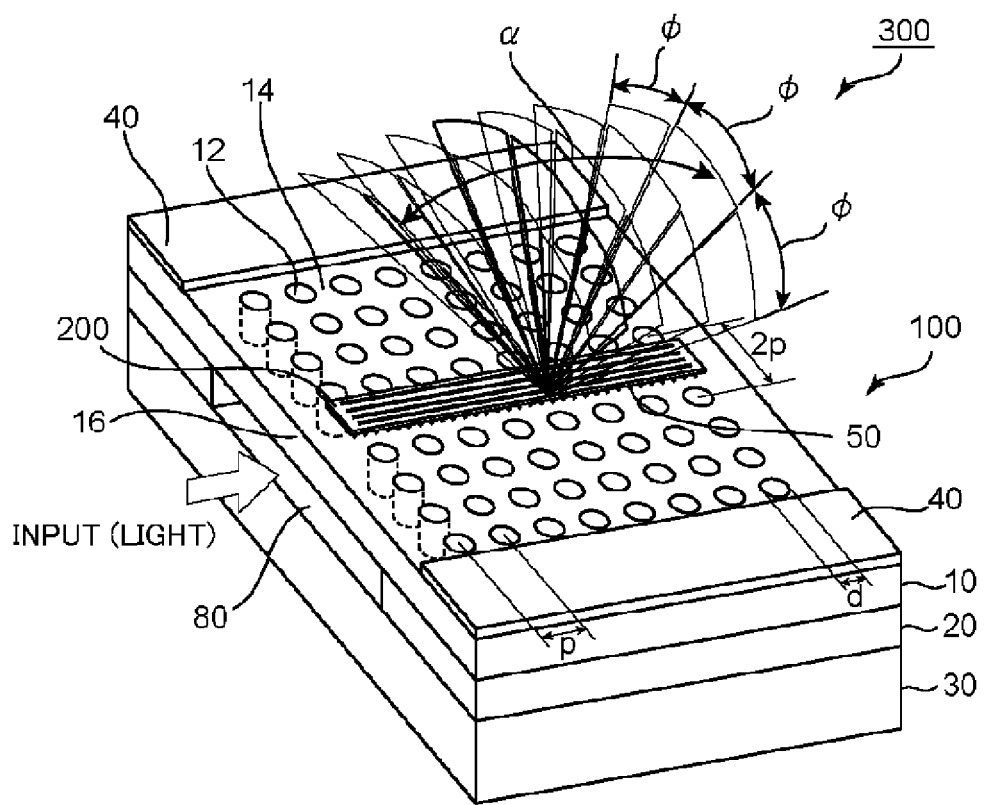
FIG. 2B is a schematic perspective view of the optical scanning element including the first light-deflecting means of FIG. 2A.
Figure 2B:
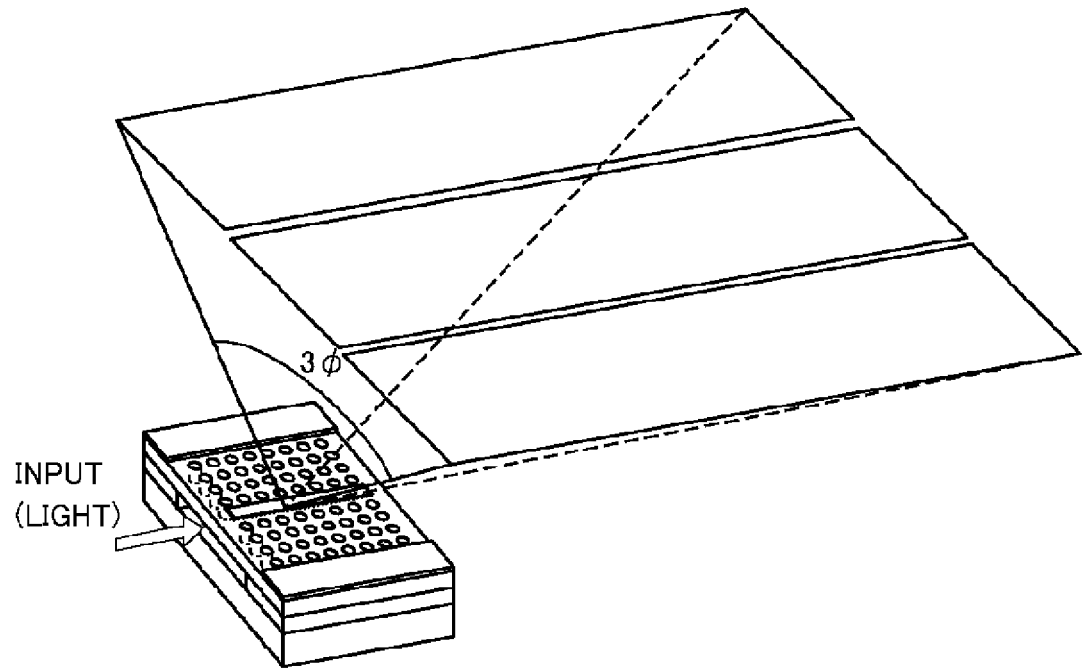
Figure 3A:
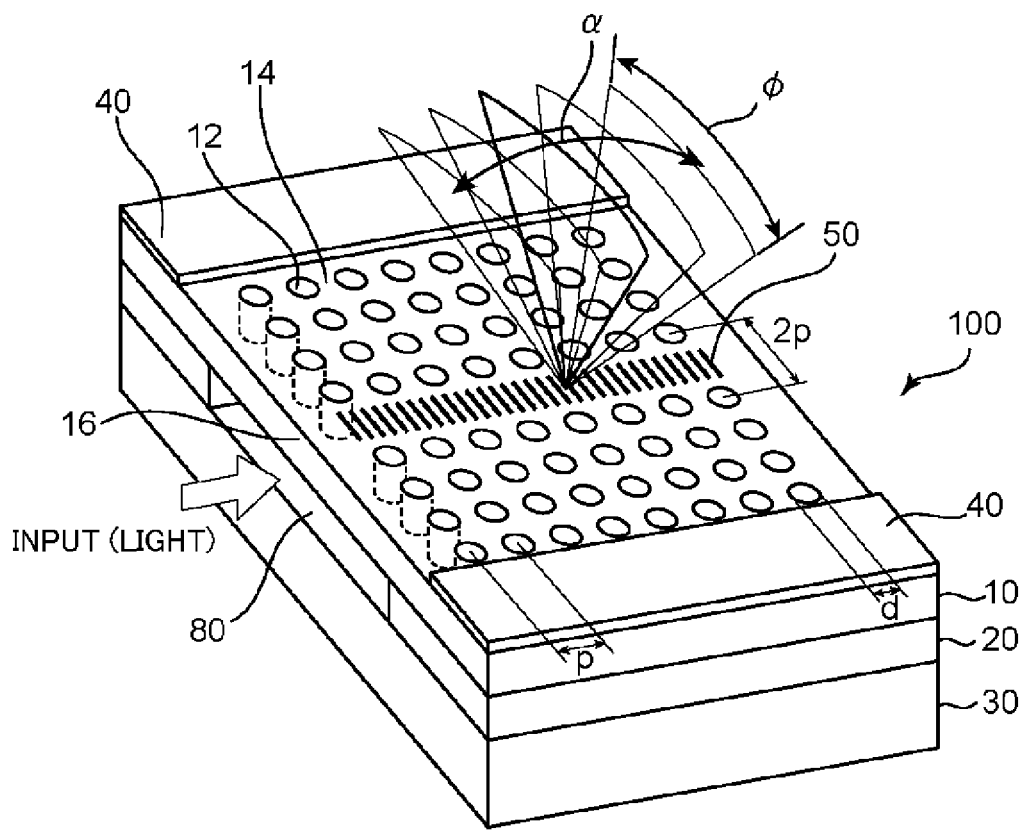
FIG. 3A is a schematic perspective view for illustrating first light-deflecting means in an optical scanning element according to another embodiment of the present invention.
Figure 3A:
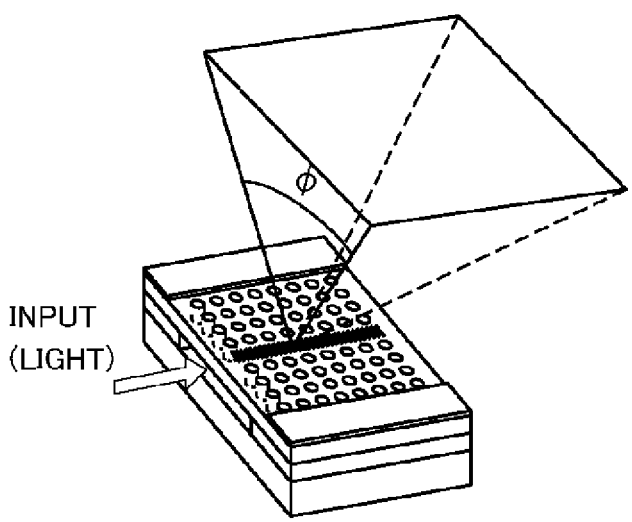
Figure 3B:
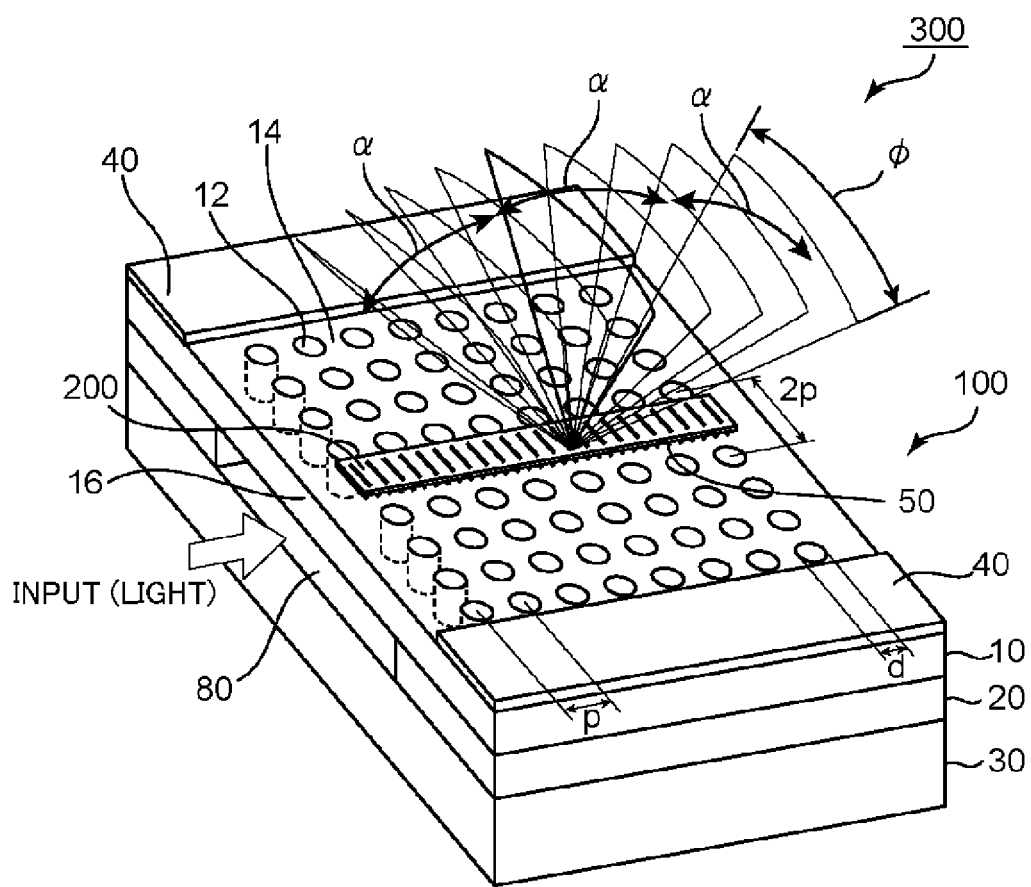
FIG. 3B is a schematic perspective view of the optical scanning element including the first light-deflecting means of FIG. 3A.
Figure 3B:
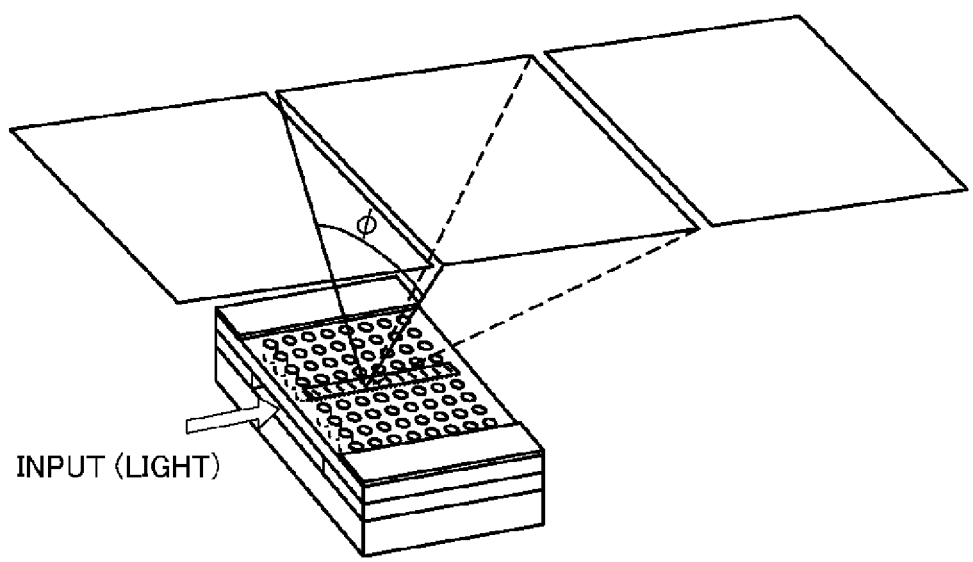
Figure 4:
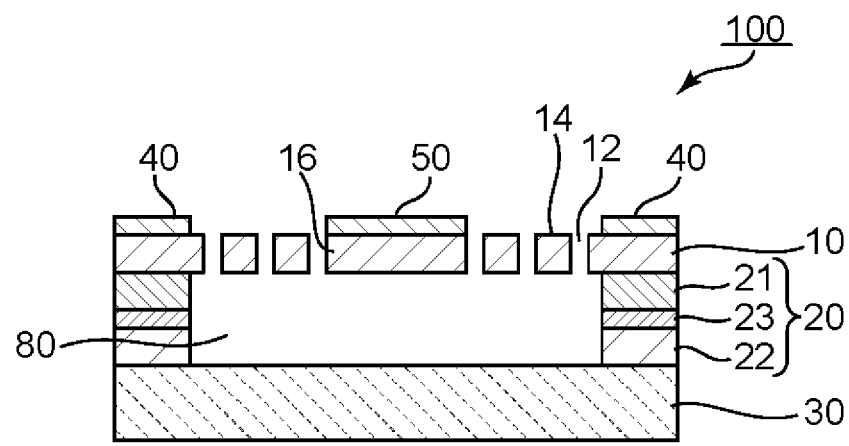
FIG. 4 is a schematic sectional view of an example of the first light-deflecting means in the optical scanning element according to the embodiment of the present invention.
Figure 5:
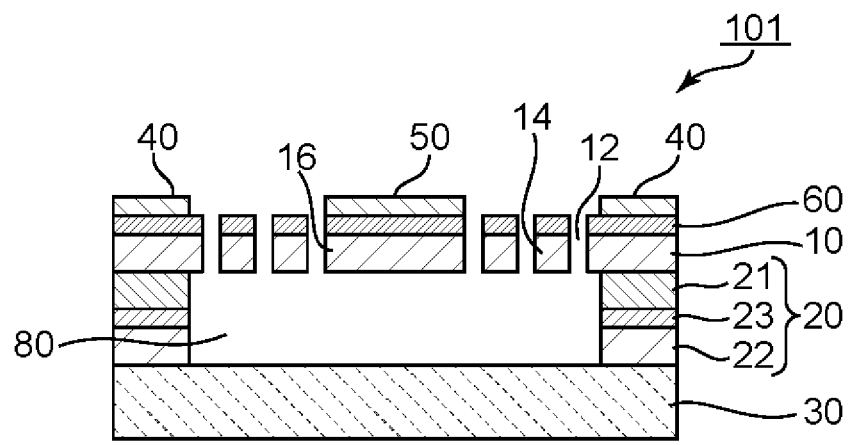
FIG. 5 is a schematic sectional view of another example of the first light-deflecting means in the optical scanning element according to the embodiment of the present invention.

FIG. 2A is a schematic perspective view for illustrating a state in which the second light-deflecting means is removed in the optical scanning element according to one embodiment of the present invention, that is, the first light-deflecting means, FIG. 2B is a schematic perspective view of the optical scanning element including the first light-deflecting means of FIG. 2A, FIG. 3A is a schematic perspective view for illustrating a state in which the second light-deflecting means is removed in an optical scanning element according to another embodiment of the present invention, that is, the first light-deflecting means, and FIG. 3B is a schematic perspective view of the optical scanning element including the first light-deflecting means of FIG. 3A. As illustrated in each of FIG. 2B and FIG. 3B, the optical scanning element 300 includes the first light-deflecting means 100 and the second light-deflecting means 200. The first light-deflecting means 100 is described with reference to FIG. 2A, FIG. 3A, FIG. 4, and FIG. 5. FIG. 4 is a schematic sectional view of an example of the first light-deflecting means, and FIG. 5 is a schematic sectional view of another example of the first light-deflecting means. The first light-deflecting means 100 includes: a photonic crystal layer 10 obtained by periodically forming holes 12 in an electro-optical crystal substrate 14; an optical waveguide 16 defined as a portion in the photonic crystal layer 10 where the holes 12 are not formed (i.e., serving as a line defect formed in the photonic crystal layer); a diffraction grating 50 arranged in the upper portion, and/or left side surface portion, and/or right side surface portion of the optical waveguide 16; and electrodes 40 and 40 arranged on the left side and right side of the optical waveguide 16. In one embodiment, like the illustrated example, the first light-deflecting means 100 may further include: a support substrate 30 arranged below the electro-optical crystal substrate (photonic crystal layer) 10, the support substrate being configured to support the electro-optical crystal substrate (photonic crystal layer) 10; a joining portion 20 configured to integrate the electro-optical crystal substrate (photonic crystal layer) 10 and the support substrate 30 with each other; and a cavity 80 defined by the lower surface of the electro-optical crystal substrate (photonic crystal layer) 10, the upper surface of the support substrate 30, and the joining portion 20. The first light-deflecting means 100 is configured to be changed in refractive index by a voltage applied between the electrodes 40 and 40, and to change the emission angle of light emitted from the upper surface of the optical waveguide 16 through the change in refractive index.

Any appropriate configuration may be adopted as the diffraction grating 50 as long as light can be emitted from the upper surface of the optical waveguide 16. For example, the diffraction grating may be flat, may be uneven, or may utilize a hologram. In the case of a flat diffraction grating, the pattern of the diffraction grating is formed by, for example, a refractive index difference, and in the case of an uneven diffraction grating, the pattern of the diffraction grating is formed by, for example, a groove or a slit. Typical examples of the pattern of the diffraction grating include a stripe, a lattice, a dot, and a specific shape (e.g., a star shape). The directions and pitch of the stripes, the arrangement pattern of the dots, and the like may be appropriately set in accordance with purposes. In one embodiment, the diffraction grating 50 has a plurality of grating grooves extending in a direction substantially perpendicular to the waveguide direction of the optical waveguide 16. That is, in one embodiment, the diffraction grating has a stripe pattern substantially perpendicular to the waveguide direction of the optical waveguide.

The diffraction grating 50 may be formed over the entirety in the waveguide direction of the optical waveguide 16, or may be formed in a predetermined region along the waveguide direction of the optical waveguide 16. The number of the predetermined regions may be one, or two or more. The ratio of the length of the diffraction grating to the length of the optical waveguide is preferably from 10% to 90%, more preferably from 20% to 80%. When the ratio of the length falls within such ranges, the transverse mode shape of light can be stabilized in a portion in the optical waveguide where the diffraction grating is not arranged. Thus, the light can be satisfactorily emitted from the upper surface of the optical waveguide by a diffraction effect in the diffraction grating region. In addition, a diffracted light pattern having satisfactory symmetry can be achieved, and hence emitted light that has a smooth intensity distribution and is free of any ripple can be obtained. The formation position of the diffraction grating in the lengthwise direction of the optical waveguide may be appropriately set in accordance with purposes. The formation position of the diffraction grating may be determined in accordance with, for example, a circuit to which the optical scanning element is connected and a method for the bonding therebetween.

The diffraction grating 50 may be preferably arranged only directly above the optical waveguide (the diffraction grating may be formed on the electro-optical crystal substrate, or may be formed separately from the electro-optical crystal substrate, or both of these actions may be performed simultaneously). With such configuration, the diffraction grating and guided light can effectively interact with each other, and as a result, extremely excellent diffraction efficiency can be achieved.

The electrodes 40 and 40 may be arranged at any appropriate positions on the left side and right side of the optical waveguide 16 as long as the performance of the optical waveguide 16 is not adversely affected. The electrodes 40 and 40 are typically arranged on the upper surfaces of the left-side end portion and right-side end portion of the photonic crystal layer (electro-optical crystal substrate) 10.

FIG. 5 is a schematic sectional view of another example of the first light-deflecting means. The first light-deflecting means of the illustrated example further includes a clad layer 60 arranged on the upper surface of the photonic crystal layer 10. In this embodiment, the diffraction grating 50 is arranged in a portion on the upper surface of the clad layer 60 corresponding to the optical waveguide 16, and the electrodes 40 and 40 are arranged on the upper surfaces of the clad layer 60 formed in the left-side end portion and right-side end portion of the photonic crystal layer (electro-optical crystal substrate) 10. The clad layer 60 may be formed only between each of the electrodes 40 and the electro-optical crystal substrate (photonic crystal layer) 10, or may be formed only directly above the optical waveguide 16.

The operation of the first light-deflecting means is described below, and then specific configurations of the respective constituents of the first light-deflecting means are described later in the section B-3 to the section B-8. A configuration well-known and commonly used in the art may be adopted for each of the electrodes, and hence their detailed description is omitted.

B-2. Operation of First Light-Deflecting Means

Figure 6:
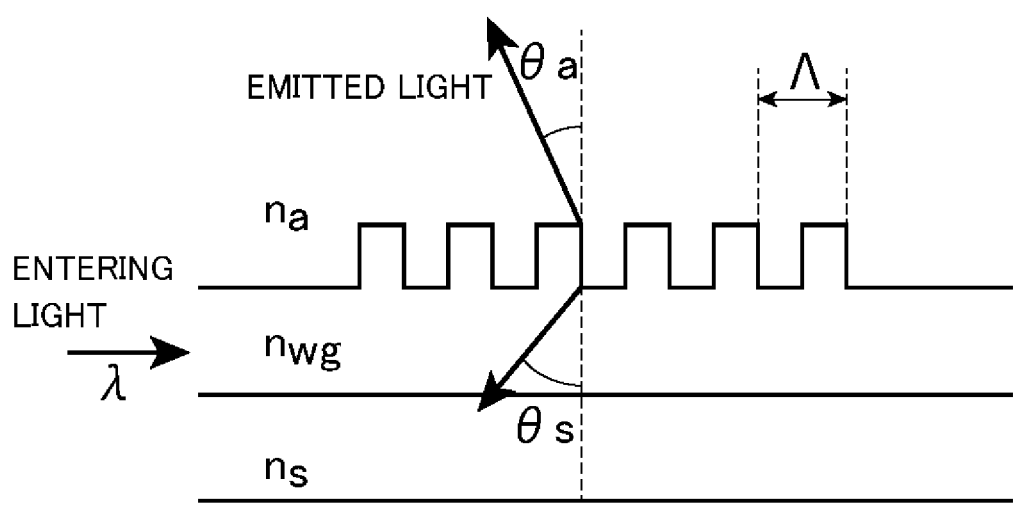
FIG. 6 is a schematic sectional view for illustrating the propagation and emission (radiation) of light in a diffraction grating that may be used in the first light-deflecting means of the optical scanning element according to the embodiment of the present invention.

At the time of the operation of the first light-deflecting means, light is caused to enter from the entering surface of the optical waveguide 16. Herein, the entering light is described. Laser light oscillating at a single wavelength, the laser light being used for LiDAR, may be used as the entering light. The longitudinal mode of the laser light may be a multimode or a single mode, and the transverse mode thereof may be a multimode or a single mode. Each of the longitudinal mode and transverse mode of the laser light is preferably a single mode. Such configuration can suppress the spread of the laser light, and hence can improve a spatial resolution. While the entered light propagates in the optical waveguide 16, diffracted light is emitted from the upper surface of the element by the action of the diffraction grating 50. The action is described in more detail with reference to FIG. 6. FIG. 6 is a schematic sectional view for illustrating the propagation and emission (radiation) of the light in the diffraction grating. In one embodiment, as described above, the diffraction grating has the plurality of grating grooves extending in the direction substantially perpendicular to the waveguide direction of the optical waveguide 16. The diffraction grating of the illustrated example is a grating pattern in a direction perpendicular to the direction of the waveguide in plan view, and in a section along the direction of the waveguide, for example, a protruding portion having a width of $\Lambda/2$ and a slit having a width of $\Lambda/2$ are alternately formed. In the slit portion, the optical waveguide below the diffraction grating is exposed. The width A of a repeating unit formed of the protruding portion and the slit is defined as the period (pitch) of the diffraction grating. A ratio between the width of the protruding portion and the width of the slit is not particularly limited, and preferably falls within the range of from 1/9 to 9/1. The light that has entered the optical waveguide 16 propagates in the waveguide direction at, for example, a propagation constant $\beta_o$. In the diffraction grating having the period $\Lambda$, light having a propagation constant satisfying a phase condition represented by the below-indicated equation (1) propagates:

$$\beta_q = \beta_o + qK \quad (q=0,\pm1,\pm2,\ldots) \qquad (1)$$

where $\beta_o$ represents the propagation constant of a waveguide mode in the optical waveguide when no diffraction grating is present, and K is represented by the below-indicated equation.

$$K = 2\pi/\Lambda$$

When an order "q" satisfying the below-indicated formula is present, the light may be emitted (radiated) toward both the upper side and lower side of the optical waveguide:

$$|\beta_q| < n_a \cdot k \text{ or } |\beta_q| < n_s \cdot k$$

where $n_a$ and $n_s$ represent the refractive indices of the upper clad and lower clad of the optical waveguide, respectively, and "k" represents a wavenumber. As described later, in the first light-deflecting means, the cavity 80 may function as the lower clad, and an upper air portion may function as the upper clad, and hence $n_a$ and $n_s$ may each represent 1.

Emission angles $\theta_a$ and $\theta_s$ with respect to a reference surface may each be determined from the below-indicated equation (2). A surface including the waveguide direction of the optical waveguide 16 as a normal is set to the reference surface (the reference surface also includes the normal of the photonic crystal layer 10).

$$n_a \cdot k \cdot \sin\theta_a = n_s \cdot k \cdot \sin\theta_s = \beta_q \qquad (2)$$

Further, the equation (1) may be represented as the below-indicated equation (3). Herein, the condition under which the equation (3) is actually valid is a case in which $q \leq -1$. Accordingly, first-order diffracted light may be emitted to the outside of the optical waveguide at the emission angles $\theta_a$ and $\theta_s$ calculated when q=−1.

$$n_{wg} \cdot \frac{2\pi}{\lambda} + \frac{2\pi}{\Lambda} q = n_a \cdot \frac{2\pi}{\lambda} \cdot \sin\theta a \quad (3)$$
$$= n_s \cdot \frac{2\pi}{\lambda} \cdot \sin\theta s$$

q: diffraction order

As is apparent from the equation (3), the emission angles $\theta_a$ and $\theta_s$ may change with $n_{wg}$ and the wavelength λ of the entering light. Herein, the $n_{wg}$ corresponds to the equivalent refractive index of light propagating in an optical waveguide (line-defect optical waveguide) formed by removing the holes corresponding to one row in the photonic crystal. According to the embodiment of the present invention, when the photonic crystal (photonic crystal layer) is formed in the electro-optical crystal substrate, the equivalent refractive index becomes extremely large at longer wavelengths of a photonic band, and the equivalent refractive index is largely changed by applying a voltage. As a result, the change of (an electric field to be formed by) the applied voltage can largely change the $n_{wg}$ in the equation (3), and hence can largely change the emission angle $\theta_a$. In other words, the change of the applied voltage can change the emission angle $\theta_a$ in a wide range and to a desired angle. As a result, the first area A1 can be adjusted in a wide range. Further, the photonic crystal based on the electro-optical crystal substrate has the following advantage over a photonic crystal based on a semiconductor (e.g., monocrystalline silicon). The photonic crystal formed from the semiconductor has a small electro-optical effect, and hence its refractive index is hardly changed even when a voltage is applied thereto. Accordingly, when an attempt is made to change an emission angle in first light-deflecting means utilizing such photonic crystal, there is a need to change the wavelength of entering light or to heat the means to change its refractive index. As a result, when the wavelength is changed, a plurality of light sources having different wavelengths are, or a multiple wavelength light source is, required. Thus, cost for the means increases, and a constraint on the design thereof becomes larger. Further, it is difficult to continuously change the wavelength of a light source, and hence it is also difficult to continuously change the emission angle. In addition, some wavelengths of the light source may preclude the achievement of a desired emission angle. In addition, when the heating is performed, it is difficult to uniformize the temperature distribution of the photonic crystal portion and to make the means quickly responsive. In addition, temperature control when an environmental temperature changes requires an external circuit including a sensor, and hence an increase in cost becomes a problem. Further, a change in equivalent refractive index with a temperature change is relatively small, and a change in emission angle of more than 50° has not been reported at present. In contrast, according to the embodiment of the present invention, a voltage to be applied between the electrodes only needs to be changed, and the voltage can be continuously changed. Accordingly, there can be achieved first light-deflecting means, which is available at low cost, can be designed with a small constraint, and can change an emission angle in a wide range and to a desired angle.

As illustrated in FIG. 2A and FIG. 3A, the emitted light beams (laser light) emitted from the first light-deflecting means (substantially, the optical waveguide) via the above-mentioned mechanism become so-called fan beams that are line shapes in plan view (line shapes in a direction perpendicular to an optical waveguide direction) and are a fan shape when viewed from the optical waveguide direction. The angle ϕ of the fan (the spread angle ϕ of the fan beams) is preferably 10° or more, more preferably 20° or more, still more preferably 30° or more, particularly preferably 50° or more. The spread angle ϕ of the fan beams may be, for example, 120° or less. The spread angle ϕ of the fan beams may be controlled by adjusting the width of the optical waveguide. In other words, as in a relationship between a near field and a far field, the narrowing of the width of the optical waveguide enlarges the spread, and hence can enlarge the spread angle. In addition, in contrast, the widening of the width of the optical waveguide can narrow the spread angle. When the spread angle falls within such ranges, first light-deflecting means having extremely excellent scanning efficiency can be achieved by a synergistic effect with the following effect: the emission angle can be changed in a wide range. That is, the first area A1 can be adjusted in a wide range. In particular, an optical scanning element for LiDAR has been required to have an angle of view of 100° or more in a horizontal direction and an angle of view of 25° or more in a vertical direction. To satisfy the requirement, the spread angle of the fan beams (in the vertical direction) may be set as described above. In addition, the variable range α of the emission angle is preferably ±40° or more, more preferably ±60° or more. The variable range α of the emission angle may be, for example, ±70° or less. As described above, according to the embodiment of the present invention, the emission angle can be changed in a range much wider than ever before. As a result, the first area A1 can be adjusted in an extremely wide range. In this description, the sign "+" of the emission angle means an output side with respect to the above-mentioned reference surface, and the sign "−" thereof means an input side with respect to the reference surface.

B-3. Photonic Crystal Layer

B-3-1. Electro-Optical Crystal Substrate

Figure 7:
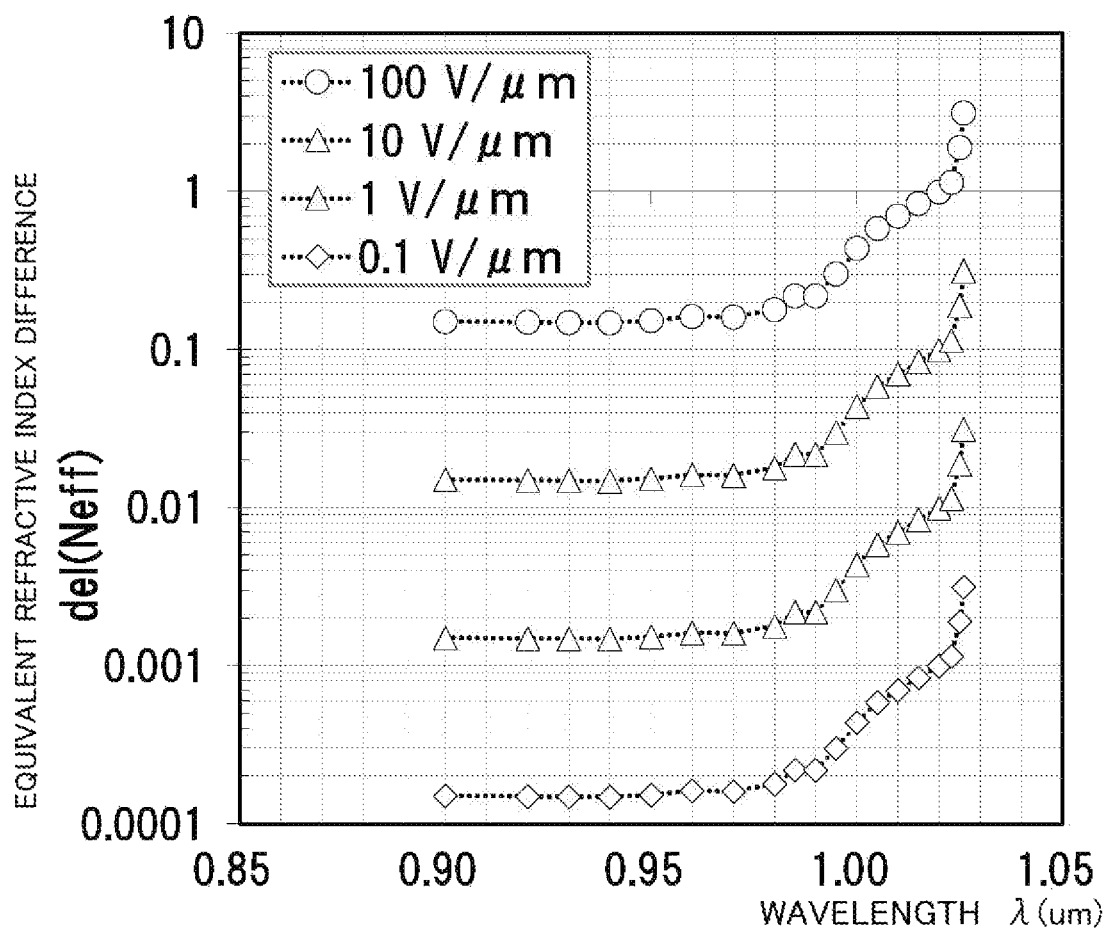
FIG. 7 is a graph for showing the wavelength dependence of an equivalent refractive index difference.

The electro-optical crystal substrate 10 includes an upper surface exposed to the outside and a lower surface positioned in a composite substrate. The electro-optical crystal substrate 10 includes the crystal of a material having an electro-optical effect. Specifically, the application of a voltage (electric field) to the electro-optical crystal substrate 10 may change its refractive index. Accordingly, the following advantage can be obtained as compared to a case in which a semiconductor material (e.g., monocrystalline silicon) is used. When the semiconductor material is used, the enlarging effect of a photonic crystal on the wavelength dependence of an equivalent refractive index is utilized. Alternatively, the enlarging effect thereof on the temperature dependence of the equivalent refractive index is utilized. In the former case, however, the wavelength dependence is enlarged by the photonic crystal, and hence fan beams are emitted at angles varying from wavelength to wavelength. Accordingly, the following problems may occur: light sources having a plurality of wavelengths are required; and signal processing is performed by independently recognizing the plurality of wavelengths on a light-receiving side, and hence the processing becomes complicated. In the latter case, some degree of time is required for heating and cooling the photonic crystal portion to set its temperature to a desired value and to uniformize its in-plane distribution, and hence it is difficult to increase the response speed. In addition, temperature control when an environmental temperature changes requires an external circuit including a sensor, and hence an increase in cost becomes a problem. Further, a change in equivalent refractive index with a temperature change is relatively small. In contrast, when the electro-optical crystal substrate is used, as described above, the application of a voltage (electric field) thereto can change an equivalent refractive index. A difference in equivalent refractive index of light propagating in an optical waveguide arranged in the photonic crystal is shown in FIG. 7. In FIG. 7, calculation results when lithium niobate is used as the electro-optical crystal substrate, and its hole period and hole radius are set to 425 nm and 144.5 nm, respectively, are shown. As shown in FIG. 7, the equivalent refractive index difference becomes larger at longer wavelengths in a photonic band. Herein, the term "longer wavelengths" means wavelengths longer than the central wavelength of the photonic band, or wavelengths longer than the wavelength of a photonic band confinement mode. In addition, in the region, the wavelength dependence of the equivalent refractive index difference also becomes larger. When a voltage is applied to the electro-optical crystal substrate, the equivalent refractive index difference may also become larger together with a change in refractive index thereof by its electro-optical effect. An equivalent refractive index difference $\Delta N_{eff}$ in FIG. 7 is represented by the below-indicated equation where $N_{eff}(0)$ represents an equivalent refractive index when no voltage is applied, and $N_{eff}(V)$ represents an equivalent refractive index when a voltage is applied.

$$\Delta N_{eff} = N_{eff}(V) - N_{eff} \quad (0)$$

Figure 8:
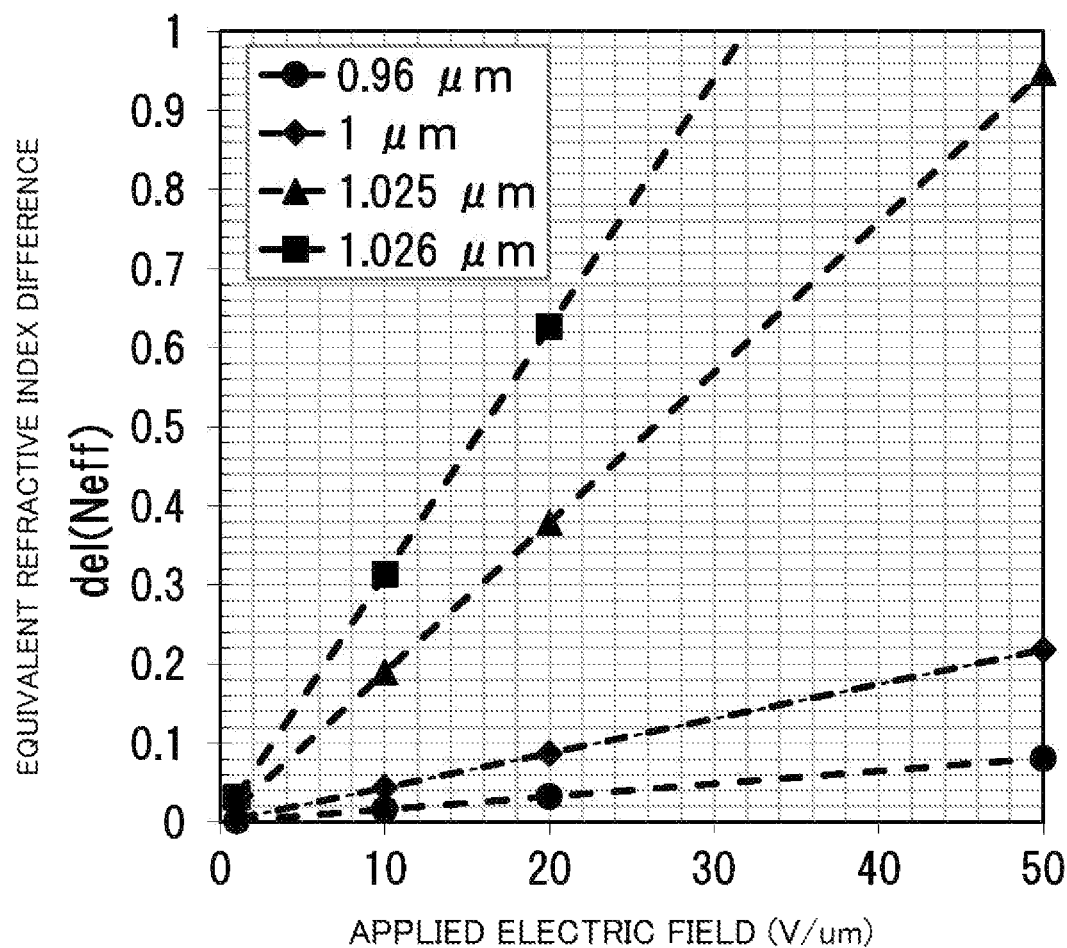
FIG. 8 is a graph for showing relationships between the equivalent refractive index difference and an applied voltage (electric field) at different wavelengths.

FIG. 8 is a graph for showing relationships between an applied electric field and the equivalent refractive index difference at specific wavelengths, the graph being obtained from the calculation results of FIG. 7. As shown in FIG. 8, in a region where a wavelength λ is short, a change in equivalent refractive index difference with the electric field is small as in an optical waveguide diffraction device in which no electro-optical crystal substrate is used. Meanwhile, in a photonic band end region where the wavelength λ is long, the change in equivalent refractive index difference with the electric field may be large. Thus, the photonic crystal utilizing the electro-optical crystal substrate can enlarge the equivalent refractive index difference (largely change the equivalent refractive index) through voltage application, and hence can largely change the emission angle of diffracted light in correspondence with the change.

In one embodiment, a c-axis of the electro-optical crystal substrate 10 may be parallel to the electro-optical crystal substrate 10. That is, the electro-optical crystal substrate 10 may be an X-cut substrate or a Y-cut substrate. In another embodiment, the c-axis of the electro-optical crystal substrate 10 may be perpendicular to the electro-optical crystal substrate 10. That is, the electro-optical crystal substrate 10 may be a Z-cut substrate. The thickness of the electro-optical crystal substrate 10 may be set to any appropriate thickness depending on the frequency and wavelength of an electromagnetic wave to be used. The thickness of the electro-optical crystal substrate 10 may be, for example, from 0.1 μm to 10 μm, or for example, from 0.1 μm to 3 μm. Typically, as described above, in the first light-deflecting means, the electro-optical crystal substrate is integrated with the support substrate, and is hence reinforced by the support substrate. Accordingly, the thickness of the electro-optical crystal substrate can be reduced. As a result, light having a wavelength suitable for the first light-deflecting means can be propagated in the optical waveguide in a single mode, and/or the efficiency with which the light is coupled with the diffraction grating can be easily improved.

Any appropriate material may be used as a material for forming the electro-optical crystal substrate 10 as long as the effects achieved in the embodiment of the present invention can be obtained. As such material, there is typically given a dielectric material (for example, a ceramic). Specific examples thereof include lithium niobate ($LiNbO_3$: LN), lithium tantalate ($LiTaO_3$: LT), potassium titanate phosphate ($KTiOPO_4$: KTP), potassium lithium niobate ($K_xLi_{(1-x)}NbO_2$: KLM), potassium niobate ($KNbO_3$: KN), potassium tantalate niobate ($KNb_xTa_{(1-x)}O_3$: KTN), and a solid solution of lithium niobate and lithium tantalate. When lithium niobate or lithium tantalate is used, lithium niobate or lithium tantalate doped with MgO, or the crystal thereof having stoichiometric composition may be used for suppressing optical damage.

B-3-2. Photonic Crystal Layer

As described above, the photonic crystal layer 10 is obtained by periodically forming the holes 12 in the electro-optical crystal substrate. A photonic crystal for forming the photonic crystal layer is a multidimensional periodic structural body formed by arranging a medium having a large refractive index and a medium having a small refractive index at a period comparable to the wavelength of light, and has the band structure of light similar to the band structure of an electron. Accordingly, appropriate design of the periodic structure can express a forbidden band (photonic band gap) for predetermined light. A photonic crystal having a forbidden band functions as an object that neither reflects nor transmits light having a predetermined wavelength. The introduction of a line defect that disturbs periodicity into the photonic crystal having a photonic band gap results in the formation of a waveguide mode in the frequency region of the band gap, and hence can achieve an optical waveguide that propagates light with a low loss.

The photonic crystal of the illustrated example is a so-called slab two-dimensional photonic crystal. The slab two-dimensional photonic crystal refers to a photonic crystal obtained by: arranging, on a thin-plate slab made of a dielectric material (in the embodiment of the present invention, the electro-optical crystal substrate), circular columnar or polygonal columnar low-refractive index pillars each having a refractive index lower than the refractive index of the material for forming the thin-plate slab at appropriate two-dimensional periodic intervals in accordance with purposes and a desired photonic band gap; and sandwiching the upper and lower portions of the thin-plate slab between an upper clad and a lower clad each having a refractive index lower than that of the thin-plate slab. In the illustrated example, the holes 12 may function as the low-refractive index pillars, a portion 14 between the holes 12 and 12 of the electro-optical crystal substrate 10 may function as a high-refractive index portion, the cavity 80 may function as the lower clad, and an upper air portion may function as the upper clad. A portion in the electro-optical crystal substrate 10 where the periodic pattern of the holes 12 is not formed serves as a line defect, and the line defect portion forms an optical waveguide 16.

As described above, the holes 12 may be formed as a periodic pattern. The holes 12 are typically arrayed so as to form regular lattices. Any appropriate form may be adopted as the form of each of the lattices as long as a predetermined photonic band gap can be achieved. Typical examples thereof include a triangular lattice and a square lattice. In one embodiment, the holes 12 may be through-holes. The through-holes are easy to form, and as a result, their refractive indices are easy to adjust. Any appropriate shape may be adopted as the plan-view shape of each of the holes (through-holes). Specific examples thereof include equilateral polygons (e.g., an equilateral triangle, a square, an equilateral pentagon, an equilateral hexagon, and an equilateral octagon), a substantially circular shape, and an elliptical shape. Of those, a substantially circular shape is preferred. The ratio of the long diameter of the substantially circular shape to the short diameter thereof is preferably from 0.90 to 1.10, more preferably from 0.95 to 1.05. As described above, the through-holes 12 may be replaced with low-refractive index pillars (pillar-shaped portions each including a low-refractive index material). However, the through-holes are easier to form, and the through-holes each include air having the lowest refractive index. Accordingly, a difference in refractive index between each of the through-holes and the optical waveguide can be made larger. In addition, part of hole diameters may be different from the other hole diameters, and part of hole periods may also be different from the other hole periods. In addition, a relationship between the hole period P and the radius d/2 of each of the holes is as follows: the ratio "d/(2P)" is preferably 0.2 or more and 0.48 or less, more preferably 0.25 or more and 0.4 or less, still more preferably 0.3 or more and 0.34 or less. When the ratio falls within such ranges, an equivalent refractive index difference caused by voltage application can be enlarged.

The lattice pattern of the holes may be appropriately set in accordance with purposes and a desired photonic band gap. In the illustrated example, the holes each having a diameter "d" form square lattices at a period P. Although the square lattices are formed in the illustrated example, when the diameters, period, and the like of the holes are appropriately set, even triangular lattices may provide the same operation, function, and effect. The square lattice patterns are formed on both the sides of the photonic crystal layer, and the optical waveguide 16 is formed in the central portion thereof where no lattice pattern is formed. The length of the optical waveguide 16 is preferably 5 mm or less, more preferably from 0.1 mm to 3 mm. According to the embodiment of the present invention, the combination of the photonic crystal layer including the electro-optical crystal substrate and a predetermined diffraction grating can extremely shorten the length of the optical waveguide. As a result, the first light-deflecting means (as a result, the optical scanning element) can be downsized. The width of the optical waveguide 16 may be, for example, from 1.01P to 3P (2P in the illustrated example) with respect to the hole period P. The number of the rows of the holes (hereinafter sometimes referred to as "lattice rows") in the optical waveguide direction may be from 3 to 10 (4 in the illustrated example) on each side of the optical waveguide. The hole period P may satisfy, for example, the below-indicated relationship:

$$(1/7) \times (\lambda/n) \leq P \leq 1.4 \times (\lambda/n)$$

where λ represents the wavelength (nm) of light to be introduced into the optical waveguide, and "n" represents the refractive index of the electro-optical crystal substrate. The hole period P may be specifically from 0.1 μm to 1 μm. In one embodiment, the hole period P may be identical to the thickness of the photonic crystal layer (electro-optical crystal substrate). The diameter "d" of each of the holes may be, for example, from 0.1P to 0.9P with respect to the hole period P. When the diameter "d" of each of the holes, the hole period P, the number of the lattice rows, the number of the holes in one lattice row, the thickness of the photonic crystal layer, the constituent material (substantially, refractive index) of the electro-optical crystal substrate, the width of the line defect portion, the width and height of the cavity to be described later, and the like are adjusted by being appropriately combined with each other, the desired photonic band gap can be obtained. Further, the same effect can be obtained for an electromagnetic wave other than a light wave. Specific examples of the electromagnetic wave include a millimeter wave, a microwave, and a terahertz wave.

In one embodiment, a through-hole for etching (not shown) may be formed in the photonic crystal layer (electro-optical crystal substrate) 10. The formation of the through-hole for etching enables an etchant to satisfactorily pervade the entirety of a region to be etched. As a result, a desired cavity can be more precisely formed. The number of the through-holes for etching may be appropriately set in accordance with purposes. Specifically, a single through-hole for etching may be formed, or a plurality of (e.g., two, three, or four) through-holes for etching may be formed. The through-hole for etching is formed at, for example, a position distant from the optical waveguide by 3 or more lattice rows. Such configuration enables the etchant to satisfactorily pervade the entirety of the region to be etched without adversely affecting the photonic band gap of the photonic crystal. The through-hole for etching may also be formed on, for example, the input portion side and/or output portion side (i.e., a corner portion of the photonic crystal layer) of the end portion of the lattice pattern opposite to the optical waveguide. Such configuration can more satisfactorily prevent adverse effects on the photonic band gap. For example, when four through-holes for etching are formed, the through-holes may be formed at the four corners of the photonic crystal layer. The size of the through-hole for etching is typically larger than the size of each of the holes 12. For example, the diameter of the through-hole for etching is preferably 5 or more times, more preferably 50 or more times, still more preferably 100 or more times as large as the diameter "d" of each of the holes. Meanwhile, the diameter of the through-hole for etching is preferably 1,000 or less times as large as the diameter "d" of each of the holes. When the diameter of the through-hole for etching is excessively small, the etchant may not satisfactorily pervade the entirety of the region to be etched. When the diameter of the through-hole for etching is excessively large, the size of the element needs to be made larger than a desired size in some cases. In addition, the mechanical strength thereof may reduce.

B-4. Joining Portion

The joining portion 20 is interposed between the electro-optical crystal substrate 10 and the support substrate 30 to integrate the substrates with each other. Typically, as illustrated in each of FIG. 2A and FIG. 2B, and FIG. 3A and FIG. 3B, the upper layer 21 and lower layer 22 of the joining portion 20 are directly joined to each other to integrate the electro-optical crystal substrate 10 and the support substrate 30 with each other. When the electro-optical crystal substrate 10 and the support substrate 30 are integrated with each other through the direct joining, peeling in the first light-deflecting means can be satisfactorily suppressed, and as a result, damage to the electro-optical crystal substrate (e.g., a crack) resulting from such peeling can be satisfactorily suppressed. The joining portion 20 is formed as an etching residual portion at the time of the formation of the holes 12 and the cavity 80. An amorphous layer 23 is typically formed at a joining interface between the upper layer 21 and the lower layer 22. The amorphous layer 23 is a layer formed at the joining interface through the direct joining of the upper layer 21 and the lower layer 22. As its name suggests, the amorphous layer has an amorphous structure, and includes an element for forming the upper layer 21 and an element for forming the lower layer 22. When the upper layer 21 and the lower layer 22 are directly joined to each other as described above, the amorphous layer 23 may be formed at the joining interface between the upper layer 21 and the lower layer 22. That is, when the upper layer 21 and the lower layer 22 are directly joined to each other, direct joining of the electro-optical crystal substrate and the support substrate can be avoided, and hence the formation of the amorphous layer on the electro-optical crystal substrate can be prevented. As a result, reductions in optical characteristics of the electro-optical crystal substrate or the optical loss thereof can be suppressed.

The term "direct joining" as used herein means that two layers or substrates (in the illustrated example, the upper layer 21 and the lower layer 22) are joined to each other without via any adhesive. The form of the direct joining may be appropriately set depending on the configuration of the layers or substrates to be joined to each other. For example, the direct joining may be achieved by the following procedure. In a high vacuum chamber (e.g., about $1\times10^{-6}$ Pa), a neutralized beam is applied to each joining surface of constituents (layers or substrates) to be joined. As a result, each joining surface is activated. Then, in a vacuum atmosphere, the activated joining surfaces are brought into contact with each other and joined to each other at normal temperature. A load at the time of the joining may be, for example, from 100 N to 20,000 N. In one embodiment, when the surface activation is performed with a neutralized beam, an inert gas is introduced into a chamber, and a high voltage is applied from a DC power source to electrodes arranged in the chamber. With such configuration, electrons move owing to an electric field generated between the electrode (positive electrode) and the chamber (negative electrode), and a beam of atoms and ions caused by the inert gas is generated. Of the beams having reached a grid, an ion beam is neutralized by the grid, and hence the beam of neutral atoms is emitted from a high-speed atom beam source. An atomic species for forming the beam is preferably an inert gas element (e.g., argon (Ar) or nitrogen (N)). A voltage at the time of activation by beam irradiation is, for example, from 0.5 kV to 2.0 kV, and an electric current is, for example, from 50 mA to 200 mA. A method for the direct joining is not limited thereto, and a surface activation method including using a fast atom beam (FAB) or an ion gun, an atomic diffusion method, a plasma joining method, or the like may also be applied.

Any appropriate configuration may be adopted for each of the upper layer 21 and the lower layer 22 in accordance with purposes, the desired configuration of the photonic crystal layer, and a method of producing the first light-deflecting means or the optical scanning element (substantially, an etching process). Specifically, each of the upper layer 21 and the lower layer 22 may be a single layer, or may have a laminated structure. Constituent materials for the upper layer and the lower layer (when at least one of the upper layer or the lower layer has a laminated structure, constituent materials for the respective layers) may also be appropriately selected in accordance with purposes, the desired configuration of the photonic crystal layer, and the etching process.

B-5. Cavity

As described above, the cavity 80 is formed by removing the upper layer 21 and the lower layer 22 (and necessarily, the amorphous layer) through etching, and may function as a lower clad. The width of the cavity is preferably larger than the width of the optical waveguide. For example, the cavity 80 may extend up to the third lattice row from the optical waveguide 16. In the illustrated example, the cavity 80 extends up to the third lattice row from the optical waveguide 16. Light propagates in the optical waveguide, and moreover, part of light energy may diffuse up to the lattice row near the optical waveguide. Accordingly, the arrangement of the cavity directly below such lattice row can suppress a propagation loss due to light leakage. From this viewpoint, the cavity may be formed over the entire region of a hole-formed portion. The height of the cavity is preferably 0.1 µm or more, and is more preferably ⅕ or more of the wavelength of the light propagating in the optical waveguide. Such height causes a thin-plate slab to function as a photonic crystal, and hence can achieve an optical waveguide having higher wavelength selectivity and a lower loss. The height of the cavity may be controlled by adjusting the thicknesses of the upper layer 21 and the lower layer 22.

B-6. Support Substrate

The support substrate 30 includes an upper surface positioned in the composite substrate and a lower surface exposed to the outside. The support substrate 30 is arranged for improving the strength of the composite substrate. Thus, the thickness of the electro-optical crystal substrate can be reduced. Any appropriate configuration may be adopted as the support substrate 30. Specific examples of a material for forming the support substrate 30 include silicon (Si), glass, SiAlON ($Si_3N_4$—$Al_2O_3$), mullite ($3Al_2O_3 \cdot 2SiO_2$, $2Al_2O_3 \cdot 3SiO_2$), aluminum nitride (AlN), silicon nitride ($Si_3N_4$), magnesium oxide (MgO), sapphire, quartz, crystal, gallium nitride (GaN), silicon carbide (SiC), and gallium oxide ($Ga_2O_3$). The coefficient of linear expansion of the material for forming the support substrate 30 is preferably as close as possible to the coefficient of linear expansion of the material for forming the electro-optical crystal substrate 10. Such configuration can suppress the thermal deformation (typically, warping) of the composite substrate. The coefficient of linear expansion of the material for forming the support substrate 30 preferably falls within the range of from 50% to 150% with respect to the coefficient of linear expansion of the material for forming the electro-optical crystal substrate 10. From this viewpoint, the support substrate may include the same material as that of the electro-optical crystal substrate 10.

B-7. Diffraction Grating

As described above, the diffraction grating 50 of the illustrated example is a grating pattern in the direction perpendicular to the optical waveguide direction in plan view, and in a section along the optical waveguide direction, the protruding portion having a width of Λ/2 and the slit having a width of Λ/2 are alternately formed. The periods of the protruding portions and the slits are each preferably from 40 nm to 1,000 nm, more preferably from 100 nm to 800 nm, still more preferably from 150 nm to 650 nm. When each of the periods of the protruding portions and the slits (accordingly, a width 2 times as large as the width of each of the protruding portion and the slit) falls within such ranges, a desired emission angle can be easily achieved. The width of each of the protruding portion and the slit may not be ½ of the period. The thickness of the protruding portion or the depth of the slit may be, for example, from 10 nm to 300 nm. When the thickness or the depth falls within such range, the following advantage is obtained: light propagating in the optical waveguide is periodically reflected by an effective refractive index difference resulting from the unevenness of the diffraction grating, and hence a diffraction effect can be expressed.

The diffraction grating (substantially, the protruding portions) may include any appropriate material as long as desired emitted light is obtained. The material for forming the diffraction grating is typically, for example, a metal oxide. Specific examples thereof include tantalum oxide, silicon oxide, aluminum oxide, titanium oxide, niobium oxide, magnesium oxide, tungsten oxide, and hafnium oxide. In addition, the diffraction grating may be directly formed on the electro-optical crystal substrate.

B-8. Clad Layer

The clad layer 60 is an optional layer to be arranged for the purpose of suppressing the absorption of guided light by the electrodes and/or improving the coupling of the guided light with the diffraction grating. The clad layer may include any appropriate material. Specific examples thereof include silicon oxide, tantalum oxide, aluminum oxide, titanium oxide, niobium oxide, magnesium oxide, tungsten oxide, and hafnium oxide. The clad layer may be formed from the same material as that of the diffraction grating. The thickness of the clad layer may be, for example, from 0.1 µm to 1 µm.

B-9. Others

Although the configuration in which the photonic crystal and the diffraction grating are combined with each other has been described as a typical example of the first light-deflecting means, as described in the section A, any appropriate configuration may be adopted as the first light-deflecting means as long as the configuration is changed in refractive index by a change in applied voltage, and can adjust the first area through the change in refractive index. For example, as described in the section A, the first light-deflecting means may be an optical phased array or a variable optical metasurface. It is obvious to a person skilled in the art that each of the array and the metasurface can emit fan beams as in the configuration in which the photonic crystal and the diffraction grating are combined with each other, and hence the same effect is obtained via the same mechanism as that of the configuration in which the photonic crystal and the diffraction grating are combined with each other.

C. Second Light-Deflecting Means

As described above, the second light-deflecting means may be typically a diffraction grating. Any appropriate configuration may be adopted as the diffraction grating as long as the effects according to the embodiment of the present invention are obtained. The basic configuration of the diffraction grating is, for example, the configuration described in each of the section B-2 and the section B-7 for the diffraction grating in the first light-deflecting means. A characteristic portion of the second light-deflecting means is described below.

Glass may be used as a material for forming the diffraction grating in addition to the materials described in the section B-7. For example, grating grooves may be formed in a glass plate by etching.

The direction in which the grating grooves of the diffraction grating extend may be a direction substantially parallel to the optical waveguide direction, or may be a direction substantially perpendicular thereto. In the case where the first area A1 has an elongated shape along the optical waveguide direction as illustrated in FIG. 2A (e.g., in the case where the spread angle ϕ of the fan beams is 30°, and the variable range α of the emission angle of the fan beams is 120°=±60°), when the direction in which the grating grooves of the diffraction grating extend is set to the direction substantially parallel to the optical waveguide direction as illustrated in FIG. 2B, the second area A2 can be spread in the direction substantially perpendicular to the optical waveguide direction as compared to the first area A1. In, for example, the example illustrated in FIG. 2B, the spread angle ϕ of the fan beams is substantially spread by a factor of about 3 in the direction perpendicular to the optical waveguide direction. In this case, the direction in which the grating grooves of the diffraction grating in the first light-deflecting means extend and the direction in which the grating grooves of the diffraction grating serving as the second light-deflecting means extend are substantially perpendicular to each other. In the case where the first area A1 has an elongated shape along the direction substantially perpendicular to the optical waveguide direction as illustrated in FIG. 3A (e.g., in the case where the spread angle ϕ of the fan beams is 60°, and the variable range α of the emission angle of the fan beams is 40°=±20°), when the direction in which the grating grooves of the diffraction grating extend is set to the direction substantially perpendicular to the optical waveguide direction as illustrated in FIG. 3B, the second area A2 can be spread in the optical waveguide direction as compared to the first area A1. In, for example, the example illustrated in FIG. 3B, the variable range α of the emission angle of the fan beams is substantially spread by a factor of about 3 in the optical waveguide direction. In this case, the direction in which the grating grooves of the diffraction grating in the first light-deflecting means extend and the direction in which the grating grooves of the diffraction grating serving as the second light-deflecting means extend are substantially parallel to each other.

When the direction in which the grating grooves of the diffraction grating extend is appropriately set as described above, the direction in which the second area A2 is spread with respect to the first area A1 can be adjusted. Further, when the pitch, diffraction order, and diffraction angle of the diffraction grating, and the wavelength of the entering light are adjusted in combination, the extent to which the second area A2 is spread with respect to the first area A1 can be controlled.

D. Method of Producing Optical Scanning Element

An example of a method of producing the optical scanning element is simply described with reference to FIG. 9A to FIG. 9E. In the illustrated example, the upper layer 21 is an optical loss-suppressing layer, and the lower layer 22 is a cavity-processing layer. The optical loss-suppressing layer 21 may be arranged for suppressing the optical loss of the electro-optical crystal substrate by preventing the formation of the amorphous layer on the electro-optical crystal substrate at the time of the direct joining of the upper and lower layers. The cavity-processing layer 22 is arranged not only for forming a cavity in the optical scanning element but also for stopping etching (typically, dry etching) at an appropriate level.

Figure 9A:
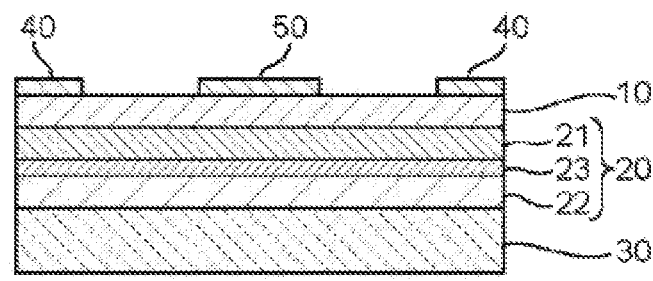
FIG. 9A to FIG. 9E are each a schematic sectional view for illustrating an example of a method of producing the optical scanning element according to the embodiment of the present invention.

First, as illustrated in FIG. 9A, a composite substrate is produced. A production procedure for the composite substrate is as follows. The optical loss-suppressing layer 21 is formed on the electro-optical crystal substrate 10 by, for example, sputtering. Meanwhile, the cavity-processing layer 22 is formed on the support substrate 30 by, for example, sputtering. The laminate of the electro-optical crystal substrate 10 and the optical loss-suppressing layer 21, and the laminate of the support substrate 30 and the cavity-processing layer 22 are directly joined to each other by using the optical loss-suppressing layer 21 and the cavity-processing layer 22 as joining surfaces. The direct joining may form the amorphous layer 23 at the joining interface between the optical loss-suppressing layer 21 and the cavity-processing layer 22. Thus, the composite substrate in which the electro-optical crystal substrate 10 and the support substrate 30 are integrated with each other may be obtained. Next, the electrodes 40 and 40 are formed in the left and right end portions of the electro-optical crystal substrate 10, and the diffraction grating 50 is formed at the position at which the optical waveguide is to be formed. The electrodes 40 and 40 may be typically formed by a lift-off. The diffraction grating 50 may be formed by dry etching (e.g., reactive ion etching) through a mask having a predetermined pattern (typically, a stripe pattern extending in the direction substantially perpendicular to the waveguide direction of the optical waveguide). The electrodes 40 and 40 may be formed before the formation of the diffraction grating 50, or may be formed after the formation of the diffraction grating 50.

Figure 9B:
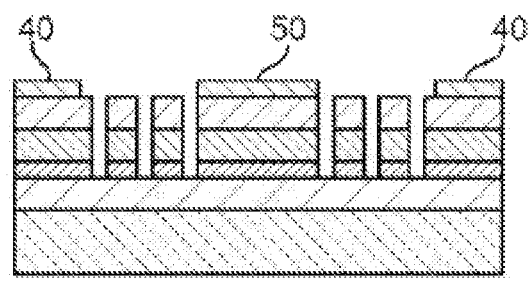
Figure 9C:
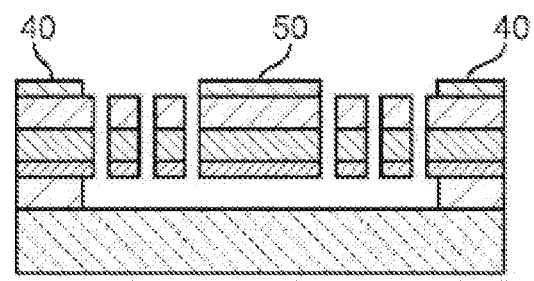
Figure 9D:
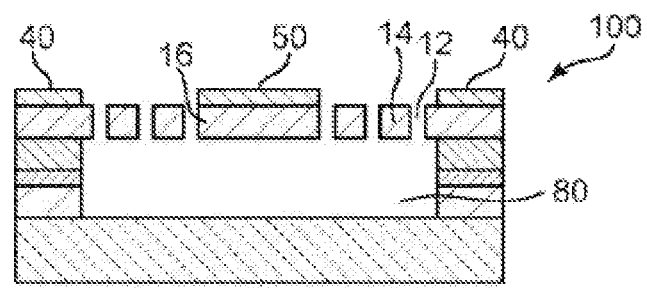

Next, as illustrated in FIG. 9B, the holes 12 are formed in the electro-optical crystal substrate 10, the optical loss-suppressing layer 21, and the amorphous layer 23 by dry etching (e.g., reactive ion etching) through a predetermined mask. Next, as illustrated in FIG. 9C, the predetermined portion of the cavity-processing layer 22 is removed by wet etching (e.g., immersion in an etchant). Next, as illustrated in FIG. 9D, the remaining optical loss-suppressing layer 21 and amorphous layer 23 are removed by wet etching (e.g., immersion in an etchant). As a result, the cavity 80 is formed, and hence the first light-deflecting means 100 is obtained.

Figure 9E:
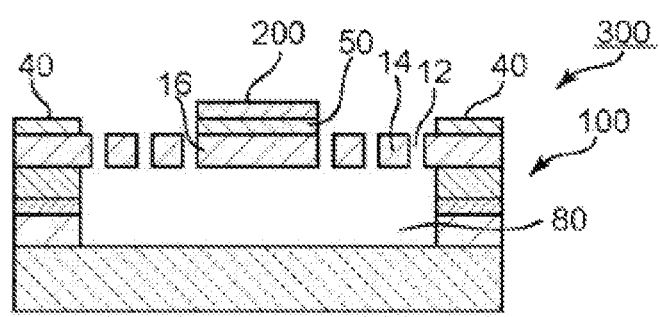

Finally, when the second light-deflecting means 200 is arranged in the upper portion of the diffraction grating 50 of the resultant first light-deflecting means 100 as illustrated in FIG. 9E, the optical scanning element 300 is obtained. The second light-deflecting means 200 may be arranged by any appropriate method. For example, the second light-deflecting means 200 may be produced by forming its grating grooves in a glass plate through dry etching (e.g., reactive ion etching) through a predetermined mask (e.g., a metal mask formed of Al or the like). The arrangement of the resultant second light-deflecting means 200 in the upper portion of the diffraction grating 50 of the first light-deflecting means 100 provides the optical scanning element 300. Examples of the method of arranging the second light-deflecting means 200 include mounting, bonding with an adhesive that is free of any optical adverse effect, and mechanical fixing. The second light-deflecting means may be arranged on the first light-deflecting means having a wafer shape, or may be arranged on the first light-deflecting means having a chip shape.

Thus, the optical scanning element 300 may be produced.

EXAMPLES

Now, the present invention is specifically described by way of Examples. However, the present invention is not limited to these Examples.

Example 1

Such an optical scanning element as illustrated in each of FIG. 2A and FIG. 2B was produced. A specific procedure was as described below.
1. Production of First Light-Deflecting Means
1-1. Production of Composite Substrate An X-cut lithium niobate substrate having a diameter of 4 inches was prepared as an electro-optical crystal substrate, and a silicon substrate having a diameter of 4 inches was prepared as a support substrate. First, amorphous silicon (a-Si) was sputtered onto the electro-optical crystal substrate to form an optical loss-suppressing layer having a thickness of 20 nm. Meanwhile, silicon oxide was sputtered onto the support substrate to form a cavity-processing layer having a thickness of 0.5 µm, and a-Si was sputtered onto the cavity-processing layer to form a joining layer having a thickness of 20 nm. Next, the surface of each of the optical loss-suppressing layer and the joining layer was subjected to CMP polishing so that the arithmetic average roughness Ra of the surface of each of the optical loss-suppressing layer and the joining layer was set to 0.3 nm or less. Next, the surfaces of the optical loss-suppressing layer and the joining layer were washed, and then the optical loss-suppressing layer and the joining layer were directly joined to each other to integrate the electro-optical crystal substrate and the support substrate with each other. The direct joining was performed as follows. In a vacuum of the order of $10^{-6}$ Pa, the joining surfaces of the electro-optical crystal substrate and the support substrate (the surfaces of the optical loss-suppressing layer and the joining layer) were irradiated with high-speed Ar neutral atom beams (acceleration voltage: 1 kV, Ar flow rate: 60 sccm) for 70 seconds. After the irradiation, the electro-optical crystal substrate and the support substrate were left standing to cool by being left for 10 minutes, and then the joining surfaces of the electro-optical crystal substrate and the support substrate were brought into contact with each other, followed by pressurization at 4.90 kN for 2 minutes. Thus, the electro-optical crystal substrate and the support substrate were joined to each other. After the joining, polishing was performed until the thickness of the electro-optical crystal substrate became 0.4 µm. Thus, a composite substrate was obtained. In the resultant composite substrate, a failure such as peeling was not observed at a joining interface.

1-2. Formation of Diffraction Grating

A diffraction grating was formed on the surface of the electro-optical crystal substrate of the composite substrate obtained in the above-mentioned section 1-1. A specific procedure was as follows. First, aluminum (Al) was formed into a film serving as a metal mask on the surface of the electro-optical crystal substrate, and a resin pattern was formed on the metal mask by a nanoimprint method. The resin pattern was formed above the portion of the electro-optical crystal substrate serving as an optical waveguide so as to have a stripe shape, which extended in a direction perpendicular to the waveguide direction of the optical waveguide and had a period of 567 nm (line/space: 283.5 nm/283.5 nm), and to have a length of 1,000 µm in the waveguide direction of the optical waveguide. Next, a metal mask of a diffraction grating pattern shape was formed by chlorine-based reactive ion etching through use of the resin pattern as a mask. Next, diffraction grating grooves each having a depth of 0.05 µm were formed by fluorine-based reactive ion etching through the metal mask of a diffraction grating pattern shape. Finally, the metal mask was removed with an Al etchant. Thus, the diffraction grating was formed on the portion of the electro-optical crystal substrate serving as the optical waveguide.

1-3. Formation of Electrodes

A pair of electrodes was formed on the surface of the electro-optical crystal substrate of the composite substrate obtained in the above-mentioned section 1-2., which had formed thereon the diffraction grating. Specifically, a resist was applied to each of the left and right end portions of the electro-optical crystal substrate, and an electrode resist pattern was formed by a photolithography process. Next, a Ti film having a thickness of 20 nm, a Pt film having a thickness of 100 nm, and a Au film having a thickness of 300 nm were sequentially formed on the surface by sputtering, and the resist was lifted off after the film formation. Thus, the electrodes were formed. A gap between the formed electrodes was 5 μm.

1-4. Production of First Light-Deflecting Means

First light-deflecting means was produced from the composite substrate obtained in the above-mentioned section 1-3., which had formed thereon the diffraction grating and the electrodes. Specifically, the first light-deflecting means was produced by the following procedure. First, molybdenum (Mo) was formed into a film serving as a metal mask on the electro-optical crystal substrate. Next, a resin pattern having holes in a predetermined arrangement was formed on the metal mask by a nanoimprint method. Specifically, 10 lattice rows having holes each having a diameter of 289 nm at a period (pitch) of 425 nm in each of an optical waveguide direction and a direction perpendicular to the optical waveguide direction were formed as a hole pattern corresponding to the holes of a photonic crystal on each of the left side and right side of the metal mask. No hole was formed in the central portion thereof, and thus a line-defect optical waveguide was obtained. A distance between adjacent holes sandwiching a line defect therebetween was set to 950 nm. Further, four holes each having a diameter of 100 μm (a pattern of through-holes for etching) were formed in corner portions (the input portion sides and output portion sides of the end portions of the left and right lattice row portions opposite to the portion serving as the optical waveguide). Next, holes corresponding to the patterns were formed in the Mo mask by etching with a Mo etchant (mixed liquid containing nitric acid, acetic acid, and phosphoric acid at a mixing ratio of 10:15:1). Next, the hole patterns and the through-holes for etching were formed in the electro-optical crystal substrate, the optical loss-suppressing layer, and the joining layer by fluorine-based reactive ion etching through the pattern-formed Mo mask. Next, the composite substrate was immersed in a buffered hydrofluoric acid (BHF) etchant so that the cavity-processing layer was removed. Thus, a cavity was formed. Further, the residue of the Mo mask was removed with the Mo etchant. Finally, the composite substrate was immersed in tetramethylammonium hydroxide (TMAH) diluted to about 10% so that the optical loss-suppressing layer and the joining layer were etched. Thus, a wafer of first light-deflecting means was produced. The resultant wafer was cut into chips by dicing to provide the first light-deflecting means. The optical waveguide length of each of the first light-deflecting means was set to 5 mm. After the chip cutting, the input-side end surface and output-side end surface of the optical waveguide were subjected to end surface polishing.

1-5. Measurement of Optical Insertion Loss of First Light-Deflecting Means

The optical insertion loss of each of the resultant first light-deflecting means (chips) was measured. Specifically, laser light having a wavelength of 1.025 μm was introduced into the chip (substantially, the optical waveguide of the photonic crystal layer) through an input-side hemispherical-ended fiber coupled with an optical fiber, and the quantity of the light output through an output-side hemispherical-ended fiber was measured with a photodetector, followed by the calculation of a propagation loss. The propagation loss of the optical waveguide was 0.5 dB/cm.

Further, a voltage to be applied between the electrodes was switched between ±100 V, and the pattern and emission angle of the laser light output from the optical waveguide were observed. With regard to the pattern and emission angle of the laser light, the angle of a fan and the emission angle dependence on the applied voltage were measured with a high-speed goniophotometric measurement system (RH50) manufactured by Otsuka Electronics Co., Ltd. As a result, the output laser light was a so-called fan beam shape that was a line shape in plan view and was a fan shape when viewed from the optical waveguide direction, and the angle of the fan (the spread angle of the fan) was 30°. In addition, it was recognized that when the applied voltage was changed, the emission angle was able to be changed from −60° to +60° with respect to the reference surface (surface including the optical waveguide direction as a normal).

In addition, to experimentally verify the responsiveness of the first light-deflecting means, whether or not the means was able to scan light at a voltage of ±15 V and 50 MHz was observed. As a result, it was able to be recognized that the means was able to scan without any problem. It can be assumed that the first light-deflecting means can operate at a frequency of the order of gigahertz because the means depends on the responsiveness of an electro-optical effect in principle. The operation of the first light-deflecting means may be affected by its electrode structure.

2. Production of Optical Scanning Element 2-1. Production of Second Light-Deflecting Means Second light-deflecting means was produced by the following procedure. Aluminum (Al) was formed into a film serving as a metal mask on one surface of a glass plate measuring 0.5 mm thick by 3 cm long by 3 cm wide, and a resin pattern was formed on the surface of the metal mask by a nanoimprint method. The resin pattern was formed into a stripe shape having a period of 2 μm in a region measuring 2 cm by 2 cm on the surface of the glass plate. Next, a metal mask having a diffraction grating pattern shape was formed by chlorine-based reactive ion etching through use of the resin pattern as a mask. Next, grating grooves were formed in the glass plate by fluorine-based reactive ion etching through the metal mask. Finally, the metal mask was removed with an Al etchant. Thus, the second light-deflecting means having the grating grooves arranged in a stripe pattern having a period of 2 μm in the glass plate was produced.

2-2. Production of Optical Scanning Element

The second light-deflecting means obtained in the above-mentioned section 2-1. was arranged in the upper portion of the diffraction grating of the first light-deflecting means obtained in the above-mentioned section 1. More specifically, the second light-deflecting means (diffraction grating) was mounted so that the direction in which the grating grooves of the second light-deflecting means extended was substantially parallel to the optical waveguide direction, and was hence substantially perpendicular to the direction in which the grating grooves of the diffraction grating in the first light-deflecting means extended. A distance between (the diffraction grating of) the first light-deflecting means and the second light-deflecting means was set to 5 mm. Thus, an optical scanning element was produced.

2-3. Evaluation of Emitted Light Characteristics of Optical Scanning Element

Laser light was input to the resultant optical scanning element in the same manner as in the above-mentioned section 1-5., and the pattern of emitted light was observed. As a result, before the application of a voltage, zeroth-order, and plus and minus first-order diffracted light beams each serving as the emitted light were observed as fan beams. The emitted light (fan beams) was a line shape in plan view (line shape in the direction perpendicular to the optical waveguide direction) and was a fan shape when viewed from the optical waveguide direction, and the spread angle φ of the entirety of the diffracted light was 120° or more. That is, the emitted light from the optical scanning element (substantially, the second light-deflecting means) was observed to be spread by a factor of 4 or more in the direction perpendicular to the optical waveguide direction as compared to the emitted light from the first light-deflecting means (spread angle $\phi=30°$). Next, the application of a voltage in the range of ±100 V to the optical scanning element recognized that the zeroth-order light, and the plus and minus first-order light beams worked with each other to enable a change in emission angle from −60° to +60° with respect to the reference surface (surface including the optical waveguide direction as a normal). That is, the emitted light from the optical scanning element (substantially, the second light-deflecting means) maintained the same variable range α of the emission angle as that of the emitted light from the first light-deflecting means. Thus, it was recognized that the resultant optical scanning element was able to scan an extremely wide range having a spread angle $\phi$ of 120° and a variable range α of the emission angle of 120°.

Example 2

Such an optical scanning element as illustrated in each of FIG. 3A and FIG. 3B was produced. A specific procedure was as described below.
1. Production of First Light-Deflecting Means First light-deflecting means was produced in the same manner as in Example 1 except that at the time of the formation of the line-defect optical waveguide, the distance between the adjacent holes sandwiching the line defect therebetween was changed from 950 nm to 760 nm. The resultant first light-deflecting means was subjected to the same evaluation as that of Example 1. As a result, the propagation loss of the optical waveguide was 0.5 dB/cm. In addition, the output laser light was a so-called fan beam shape that was a line shape in plan view and was a fan shape when viewed from the optical waveguide direction, and the angle of the fan (the spread angle of the fan) was 60°. Further, the switching of a voltage to be applied between the electrodes of the means between ±50 V recognized that the emission angle of the light was able to be changed from −20° to +20° with respect to the reference surface (surface including the optical waveguide direction as a normal). Finally, to experimentally verify the responsiveness of the means, whether or not the means was able to scan light at a voltage of ±15 V and 50 MHz was observed. As a result, it was able to be recognized that the means was able to scan without any problem.
2. Production of Optical Scanning Element Second light-deflecting means (diffraction grating) having grating grooves arranged in a stripe pattern in a glass plate was produced in the same manner as in Example 1 except that the period of the pattern was set to 1.6 μm. An optical scanning element was produced in the same manner as in Example 1 except that: the thus-obtained second light-deflecting means was used; and the second light-deflecting means was mounted so that the direction in which the grating grooves of the second light-deflecting means extended was substantially perpendicular to the optical waveguide direction, and was hence substantially parallel to the direction in which the grating grooves of the diffraction grating in the first light-deflecting means extended. Laser light was input to the resultant optical scanning element in the same manner as in Example 1, and the pattern of emitted light was observed. As a result, before the application of a voltage, zeroth-order, and plus and minus first-order diffracted light beams each serving as the emitted light were observed as fan beams. The fan beams were such that the minus first-order diffracted light, the zeroth-order diffracted light, and the plus first-order diffracted light were arranged along the optical waveguide direction, and the spread angle $\phi$ of each of the fan beams was 60°. It was recognized that the emission angle of each of the fan beams was able to be changed in the variable range α of from −20° to +20° with respect to the reference surface. Thus, it was recognized that the resultant optical scanning element was able to scan an extremely wide range having a spread angle $\phi$ of 60° and a variable range α of the emission angle of 120°.

The optical scanning element according to the embodiment of the present invention may be used as a so-called scanner in a wide range. The optical scanning element is used as, for example, a laser radar, a laser scanner, or LiDAR, and may be applied to an obstacle-detecting system or a ranging system for the automatic operation control of an automobile or for the position control of a robot or a drone.

According to the embodiment of the present invention, in the optical scanning element, the first light-deflecting means, which is configured to be changed in refractive index by a change in applied voltage, and to adjust the first area serving as an area to which light is emitted through the change in refractive index, and the second light-deflecting means for emitting the light that has been emitted to the first area to the second area wider than the first area through diffraction are used in combination. Thus, the optical scanning element, which has a large scan angle, is quickly responsive, and can be downsized, can be achieved.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. An optical scanning element, comprising:
   first light-deflecting means for emitting light to a first area; and
   second light-deflecting means for emitting the light that has been emitted to the first area to a second area wider than the first area,
   wherein the first light-deflecting means is configured to be changed in refractive index by a change in applied voltage, and to adjust the first area through the change in refractive index,
   wherein the second light-deflecting means is configured to adjust the second area through diffraction, and
   wherein the first light-deflecting means includes:
      an optical waveguide;
      a diffraction grating arranged in at least one portion selected from an upper portion, a left side surface portion, and a right side surface portion of the optical waveguide; and
      electrodes arranged on a left side and a right side of the optical waveguide, and
      is configured so that an emission angle of light emitted from an upper surface of the optical waveguide changes.

2. The optical scanning element according to claim 1, wherein the first light-deflecting means is one selected from the group consisting of: a combination of a photonic crystal and a diffraction grating; an optical phased array; and a variable optical metasurface.

3. The optical scanning element according to claim 2, wherein the second light-deflecting means is a diffraction grating.

4. The optical scanning element according to claim 1, wherein
the optical waveguide is a line-defect formed in a photonic crystal layer, the photonic crystal layer being obtained by periodically forming holes in an electro-optical crystal substrate.

5. The optical scanning element according to claim 1, wherein the diffraction grating has a plurality of grating grooves extending in a direction substantially perpendicular to a waveguide direction of the optical waveguide.

6. The optical scanning element according to claim 5,
wherein the second light-deflecting means is a diffraction grating having grating grooves, and
wherein the direction in which the grating grooves extend in the first light-deflecting means and a direction in which the grating grooves extend in the second light-deflecting means are substantially perpendicular to each other.

7. The optical scanning element according to claim 5,
wherein the second light-deflecting means is a diffraction grating having grating grooves, and
wherein the direction in which the grating grooves extend in the first light-deflecting means and a direction in which the grating grooves extend in the second light-deflecting means are substantially parallel to each other.

8. The optical scanning element according to claim 1, wherein the first light-deflecting means further includes:
a support substrate arranged below the electro-optical crystal substrate, the support substrate being configured to support the electro-optical crystal substrate;
a joining portion configured to integrate the electro-optical crystal substrate and the support substrate with each other; and
a cavity defined by a lower surface of the electro-optical crystal substrate, an upper surface of the support substrate, and the joining portion.

9. The optical scanning element according to claim 1, wherein the electro-optical crystal substrate includes one selected from the group consisting of: lithium niobate; lithium tantalate; potassium titanate phosphate; potassium lithium niobate; potassium niobate; potassium tantalate niobate; and a solid solution of lithium niobate and lithium tantalate.

* * * * *